(12) United States Patent
New et al.

(10) Patent No.: US 7,818,350 B2
(45) Date of Patent: Oct. 19, 2010

(54) SYSTEM AND METHOD FOR CREATING A COLLABORATIVE PLAYLIST

(75) Inventors: Matthew David New, Irvine, CA (US); Daniel Davidson Baird, Carlsbad, CA (US)

(73) Assignee: Yahoo! Inc., Sunnyvale, CA (US)

( * ) Notice: Subject to any disclaimer, the term of this patent is extended or adjusted under 35 U.S.C. 154(b) by 215 days.

(21) Appl. No.: 11/249,802

(22) Filed: Oct. 12, 2005

(65) Prior Publication Data
US 2006/0195521 A1 Aug. 31, 2006

Related U.S. Application Data

(60) Provisional application No. 60/657,222, filed on Feb. 28, 2005, provisional application No. 60/678,718, filed on May 5, 2005.

(51) Int. Cl.
*G06F 17/30* (2006.01)
*G06F 15/16* (2006.01)

(52) U.S. Cl. ........................ 707/803; 709/204
(58) Field of Classification Search ............... 707/104.1, 707/802, 803; 709/204
See application file for complete search history.

(56) References Cited

U.S. PATENT DOCUMENTS

| | | | |
|---|---|---|---|
| 5,566,353 A | 10/1996 | Cho et al. | |
| 5,616,876 A | 4/1997 | Cluts | |
| 5,729,741 A | 3/1998 | Liaguno et al. | |
| 5,748,956 A | 5/1998 | Lafer et al. | |
| 5,864,870 A | 1/1999 | Guck | |
| 5,886,698 A | 3/1999 | Sciammarella et al. | |
| 5,890,152 A | 3/1999 | Rapaport et al. | |
| 5,903,892 A | 5/1999 | Hoffert et al. | |
| 5,928,330 A | 7/1999 | Goetz et al. | |
| 5,950,173 A | 9/1999 | Perkowski | |
| 5,982,369 A | 11/1999 | Sciammarella et al. | |
| 5,996,015 A | 11/1999 | Day et al. | |
| 6,006,241 A * | 12/1999 | Purnaveja et al. | 715/205 |
| 6,064,380 A | 5/2000 | Swenson et al. | |
| 6,118,450 A | 9/2000 | Proehl et al. | |
| 6,157,377 A | 12/2000 | Shah-Nazaroff et al. | |
| 6,192,340 B1 | 2/2001 | Abecassis | |
| 6,226,672 B1 * | 5/2001 | DeMartin et al. | 709/219 |
| 6,232,539 B1 | 5/2001 | Looney et al. | |
| 6,248,946 B1 * | 6/2001 | Dwek | 84/609 |

(Continued)

FOREIGN PATENT DOCUMENTS

EP 1 176 840 1/2002

(Continued)

OTHER PUBLICATIONS

Hauver, David B., et al., "Flycasting: Using Collaborative Filtering to Generate a Playlist for Online Radio", WEDELMUSIC '01, Nov. 23-24, 2001, pp. 123-130.*

(Continued)

*Primary Examiner*—Robert Stevens
(74) *Attorney, Agent, or Firm*—James J. DeCarlo; Greenberg Traurig, LLP

(57) ABSTRACT

A method, server, and user interface associated with creating a collaborative playlist between one or more users based on user interaction with a media program. In one embodiment, the media program is an instant messaging application.

100 Claims, 10 Drawing Sheets

U.S. PATENT DOCUMENTS

| | | |
|---|---|---|
| 6,356,971 B1 * | 3/2002 | Katz et al. ................. 710/301 |
| 6,389,467 B1 | 5/2002 | Eyal |
| 6,393,430 B1 | 5/2002 | Van Ryzin |
| 6,466,918 B1 | 10/2002 | Spiegel et al. |
| 6,477,704 B1 | 11/2002 | Cremia |
| 6,484,199 B2 | 11/2002 | Eyal |
| 6,526,411 B1 | 2/2003 | Ward |
| 6,538,665 B2 | 3/2003 | Crow et al. |
| 6,605,770 B2 | 8/2003 | Yamane et al. |
| 6,609,096 B1 | 8/2003 | De Bonet et al. |
| 6,662,231 B1 | 12/2003 | Drosset et al. |
| 6,691,162 B1 | 2/2004 | Wick |
| 6,721,489 B1 | 4/2004 | Benyamin et al. |
| 6,728,729 B1 | 4/2004 | Jawa et al. |
| 6,731,312 B2 | 5/2004 | Robbin |
| 6,735,628 B2 | 5/2004 | Eyal |
| 6,738,766 B2 | 5/2004 | Peng |
| 6,816,944 B2 * | 11/2004 | Peng .......................... 711/133 |
| 6,820,238 B1 | 11/2004 | Auflick et al. |
| 6,829,033 B2 | 12/2004 | Hose et al. |
| 6,850,256 B2 | 2/2005 | Crow et al. |
| 6,928,433 B2 | 8/2005 | Goodman et al. |
| 6,941,324 B2 | 9/2005 | Plastina et al. |
| 6,968,179 B1 | 11/2005 | De Vries |
| 6,987,221 B2 * | 1/2006 | Platt ............................ 84/601 |
| 7,013,290 B2 | 3/2006 | Ananian |
| 7,020,704 B1 | 3/2006 | Lipscomb et al. |
| 7,024,424 B1 | 4/2006 | Platt et al. |
| 7,043,477 B2 | 5/2006 | Mercer et al. |
| 7,096,234 B2 | 8/2006 | Plastina et al. |
| 7,111,009 B1 * | 9/2006 | Gupta et al. ............. 369/30.08 |
| 7,113,767 B2 | 9/2006 | Vaananen |
| 7,127,454 B2 | 10/2006 | Deguchi |
| 7,136,874 B2 | 11/2006 | Mercer et al. |
| 7,146,404 B2 | 12/2006 | Kay et al. |
| 7,159,000 B2 | 1/2007 | Plastina et al. |
| 7,219,308 B2 * | 5/2007 | Novak et al. ................ 715/768 |
| 7,275,063 B2 | 9/2007 | Horn |
| 7,277,852 B2 | 10/2007 | Iyoku et al. |
| 7,281,034 B1 | 10/2007 | Eyal |
| 7,310,350 B1 | 12/2007 | Shao et al. |
| 7,409,639 B2 | 8/2008 | Dempski et al. |
| 7,426,537 B2 * | 9/2008 | Lee et al. .................... 709/204 |
| 7,617,278 B1 * | 11/2009 | Edelman et al. ............. 709/204 |
| 2001/0018858 A1 * | 9/2001 | Dwek .......................... 84/609 |
| 2001/0033296 A1 | 10/2001 | Fullerton et al. |
| 2001/0042107 A1 | 11/2001 | Palm |
| 2002/0002498 A1 | 1/2002 | Hatakeyama |
| 2002/0010652 A1 | 1/2002 | Deguchi |
| 2002/0040326 A1 | 4/2002 | Spratt |
| 2002/0042834 A1 | 4/2002 | Kremens et al. |
| 2002/0045960 A1 | 4/2002 | Phillips et al. |
| 2002/0049037 A1 | 4/2002 | Christensen et al. |
| 2002/0052933 A1 | 5/2002 | Leonhard et al. |
| 2002/0054134 A1 | 5/2002 | Kelts |
| 2002/0087887 A1 * | 7/2002 | Busam et al. ................ 713/201 |
| 2002/0089529 A1 | 7/2002 | Robbin |
| 2002/0099731 A1 | 7/2002 | Abajian |
| 2002/0126135 A1 | 9/2002 | Ball et al. |
| 2002/0138619 A1 | 9/2002 | Ramaley et al. |
| 2002/0151327 A1 | 10/2002 | Levitt |
| 2002/0152267 A1 | 10/2002 | Lennon |
| 2002/0156546 A1 | 10/2002 | Ramaswamy |
| 2002/0188363 A1 | 12/2002 | Ashy |
| 2003/0023427 A1 | 1/2003 | Cassin et al. |
| 2003/0028539 A1 | 2/2003 | Nunome et al. |
| 2003/0031176 A1 | 2/2003 | Sim |
| 2003/0037035 A1 | 2/2003 | Deguchi |
| 2003/0041108 A1 * | 2/2003 | Henrick et al. ............. 709/205 |
| 2003/0046273 A1 | 3/2003 | Deshpande |
| 2003/0046399 A1 | 3/2003 | Boulter et al. |
| 2003/0065639 A1 | 4/2003 | Fiennes et al. |
| 2003/0071851 A1 | 4/2003 | Unger et al. |
| 2003/0088571 A1 | 5/2003 | Ekkel |
| 2003/0110502 A1 | 6/2003 | Creed |
| 2003/0151618 A1 * | 8/2003 | Johnson et al. ............. 345/716 |
| 2003/0172090 A1 | 9/2003 | Asunmaa et al. |
| 2003/0182254 A1 | 9/2003 | Plastina et al. |
| 2003/0182315 A1 * | 9/2003 | Plastina et al. ............. 707/200 |
| 2003/0191753 A1 | 10/2003 | Hoch |
| 2003/0200452 A1 | 10/2003 | Tagawa et al. |
| 2003/0212710 A1 | 11/2003 | Guy |
| 2003/0222907 A1 | 12/2003 | Heikes et al. |
| 2003/0223411 A1 | 12/2003 | de la Fuente |
| 2003/0225834 A1 * | 12/2003 | Lee et al. .................... 709/204 |
| 2003/0225848 A1 | 12/2003 | Heikes et al. |
| 2003/0228134 A1 | 12/2003 | Kim et al. |
| 2003/0236582 A1 | 12/2003 | Zamir et al. |
| 2003/0236711 A1 | 12/2003 | Deguchi |
| 2003/0236832 A1 | 12/2003 | McIntyre et al. |
| 2003/0237043 A1 * | 12/2003 | Novak et al. ............. 715/500.1 |
| 2004/0002938 A1 | 1/2004 | Deguchi |
| 2004/0003090 A1 * | 1/2004 | Deeds ......................... 709/227 |
| 2004/0003706 A1 | 1/2004 | Tagawa et al. |
| 2004/0019497 A1 | 1/2004 | Volk et al. |
| 2004/0055445 A1 | 3/2004 | Iyoku et al. |
| 2004/0056901 A1 | 3/2004 | March et al. |
| 2004/0057348 A1 | 3/2004 | Shteyn et al. |
| 2004/0057449 A1 | 3/2004 | Black |
| 2004/0064476 A1 | 4/2004 | Rounds |
| 2004/0068606 A1 | 4/2004 | Kim et al. |
| 2004/0078383 A1 | 4/2004 | Mercer et al. |
| 2004/0083273 A1 | 4/2004 | Madison et al. |
| 2004/0088348 A1 | 5/2004 | Yeager et al. |
| 2004/0103153 A1 | 5/2004 | Chang et al. |
| 2004/0117442 A1 | 6/2004 | Thielen |
| 2004/0117843 A1 | 6/2004 | Karaoguz et al. |
| 2004/0128308 A1 | 7/2004 | Obrador |
| 2004/0137882 A1 * | 7/2004 | Forsyth ...................... 455/414.1 |
| 2004/0148353 A1 | 7/2004 | Karaoguz et al. |
| 2004/0162871 A1 | 8/2004 | Pabla et al. |
| 2004/0162878 A1 | 8/2004 | Lewis et al. |
| 2004/0165006 A1 * | 8/2004 | Kirby et al. ................. 345/740 |
| 2004/0174905 A1 | 9/2004 | Caspi et al. |
| 2004/0177116 A1 | 9/2004 | McConn |
| 2004/0184778 A1 | 9/2004 | Jung et al. |
| 2004/0196315 A1 | 10/2004 | Swearingen et al. |
| 2004/0199667 A1 | 10/2004 | Dobbins |
| 2004/0201609 A1 | 10/2004 | Obrador |
| 2004/0205028 A1 | 10/2004 | Verosub et al. |
| 2004/0215731 A1 | 10/2004 | Tzann-en Szeto |
| 2004/0220791 A1 * | 11/2004 | Lamkin et al. ................ 703/11 |
| 2004/0220926 A1 | 11/2004 | Lamkin et al. |
| 2004/0221299 A1 * | 11/2004 | Gibbs et al. ................. 719/331 |
| 2004/0226039 A1 | 11/2004 | Jung et al. |
| 2004/0236568 A1 | 11/2004 | Guillen et al. |
| 2004/0252604 A1 | 12/2004 | Johnson et al. |
| 2004/0260753 A1 * | 12/2004 | Regan ........................ 709/200 |
| 2004/0267812 A1 | 12/2004 | Harris et al. |
| 2005/0004985 A1 | 1/2005 | Stochosky |
| 2005/0004995 A1 | 1/2005 | Stochosky |
| 2005/0021398 A1 | 1/2005 | McCleskey et al. |
| 2005/0021470 A1 | 1/2005 | Martin et al. |
| 2005/0021750 A1 | 1/2005 | Abrams et al. |
| 2005/0027539 A1 | 2/2005 | Weber et al. |
| 2005/0038707 A1 * | 2/2005 | Roever et al. ................. 705/21 |
| 2005/0038724 A1 | 2/2005 | Roever et al. |
| 2005/0038814 A1 | 2/2005 | Iyengar et al. |
| 2005/0038819 A1 | 2/2005 | Hicken et al. |
| 2005/0038877 A1 | 2/2005 | Gupta et al. |
| 2005/0044229 A1 | 2/2005 | Brown |
| 2005/0055472 A1 | 3/2005 | Krzyzanowski et al. |
| 2005/0060264 A1 * | 3/2005 | Schrock et al. ................ 705/51 |
| 2005/0065935 A1 | 3/2005 | Chebolu et al. |

| | | | |
|---|---|---|---|
| 2005/0071780 A1* | 3/2005 | Muller et al. ............... | 715/825 |
| 2005/0080807 A1* | 4/2005 | Beilinson et al. ............ | 707/102 |
| 2005/0086309 A1 | 4/2005 | Galli et al. | |
| 2005/0086606 A1* | 4/2005 | Blennerhassett et al. .... | 715/760 |
| 2005/0091069 A1 | 4/2005 | Chuang | |
| 2005/0102191 A1 | 5/2005 | Heller | |
| 2005/0108176 A1 | 5/2005 | Jarol et al. | |
| 2005/0108320 A1 | 5/2005 | Lord et al. | |
| 2005/0114324 A1 | 5/2005 | Mayer | |
| 2005/0138543 A1 | 6/2005 | Liu | |
| 2005/0146996 A1 | 7/2005 | Roman | |
| 2005/0160111 A1 | 7/2005 | Plastina et al. | |
| 2005/0172001 A1* | 8/2005 | Zaner et al. ................. | 709/205 |
| 2005/0197906 A1 | 9/2005 | Kindig et al. | |
| 2005/0198317 A1 | 9/2005 | Byers | |
| 2005/0210396 A1 | 9/2005 | Galli | |
| 2005/0210507 A1* | 9/2005 | Hawkins et al. ............... | 725/46 |
| 2005/0216443 A1 | 9/2005 | Morton et al. | |
| 2005/0216855 A1* | 9/2005 | Kopra et al. ................. | 715/767 |
| 2005/0227676 A1 | 10/2005 | De Vries | |
| 2005/0234875 A1 | 10/2005 | Auerbach et al. | |
| 2005/0234995 A1* | 10/2005 | Plastina et al. ........... | 707/104.1 |
| 2005/0240494 A1 | 10/2005 | Cue et al. | |
| 2005/0246651 A1 | 11/2005 | Krzanowski | |
| 2005/0251565 A1 | 11/2005 | Weel | |
| 2005/0251566 A1* | 11/2005 | Weel .......................... | 709/219 |
| 2005/0251576 A1 | 11/2005 | Weel | |
| 2005/0251807 A1 | 11/2005 | Weel | |
| 2005/0262186 A1* | 11/2005 | Szeto et al. ................. | 709/203 |
| 2006/0008256 A1* | 1/2006 | Khedouri et al. ............ | 386/124 |
| 2006/0010240 A1 | 1/2006 | Chuah | |
| 2006/0031770 A1 | 2/2006 | McMenamin | |
| 2006/0041627 A1 | 2/2006 | Tu | |
| 2006/0056324 A1* | 3/2006 | Hyyppa et al. .............. | 370/310 |
| 2006/0080103 A1 | 4/2006 | Van Breemen | |
| 2006/0095502 A1 | 5/2006 | Lewis et al. | |
| 2006/0107297 A1 | 5/2006 | Toyama et al. | |
| 2006/0123058 A1 | 6/2006 | Mercer et al. | |
| 2006/0123113 A1 | 6/2006 | Friedman | |
| 2006/0133768 A1 | 6/2006 | Ellis | |
| 2006/0143236 A1* | 6/2006 | Wu .......................... | 707/104.1 |
| 2006/0167985 A1* | 7/2006 | Albanese et al. ............ | 709/203 |
| 2006/0173838 A1 | 8/2006 | Garg et al. | |
| 2006/0190410 A1 | 8/2006 | Harper | |
| 2006/0195462 A1 | 8/2006 | Rogers | |
| 2006/0218195 A1 | 9/2006 | LaChapelle et al. | |
| 2007/0011206 A1 | 1/2007 | Gupta et al. | |
| 2007/0016865 A1* | 1/2007 | Johnson et al. ............. | 715/716 |
| 2007/0050413 A1 | 3/2007 | Kominek et al. | |
| 2007/0143740 A1 | 6/2007 | Hoerentrup et al. | |
| 2007/0159934 A1 | 7/2007 | Weon | |
| 2007/0191108 A1 | 8/2007 | Brunet De Courssou et al. | |
| 2008/0215882 A1 | 9/2008 | Coldicott et al. | |

FOREIGN PATENT DOCUMENTS

| | | |
|---|---|---|
| EP | 1 489 800 | 12/2004 |
| EP | 1-489-800 A1 * | 12/2004 |
| WO | WO 02/33579 | 4/2002 |
| WO | WO 2004/046874 | 6/2004 |

OTHER PUBLICATIONS

Ku, William, et al., "Survey on the Technological Aspects of Digital Rights Management", ISC 2004, LNCS 3225, Springer Berlin, Sep. 21, 2004, pp. 391-403.*

Liang, Qianhui, et al., "A United Approach to Discover Multimedia Web Services", ISMSE '03, Dec. 10-12, 2003, pp. 62-69.*

Microsoft Computer Dictionary, 4th Edition, Microsoft Press, Redmond, WA, © 1999, pp. 348 and 461.*

Rajani, Rakhi, et al., "Viewing and Annotating Media with MemoryNet", CHI 2004, Vienna, Austria, Apr. 24-29, 2004, pp. 1517-1520.*

Bayardo, Roberto J., et al., "Peer-to-Peer Sharing of Web Applications", WWW 2003, Budapest, Hungary, May 20-24, 2003, pp. 1-2.*

Gradman, Eric, "Distributed Social Software", Dec. 12, 2003, pp. 1-10.*

Pachet, François, et al., "Popular Music Access: The Sony Music Browser", Journal of the American Society for Information Science and Technology, vol. 55, Issue 12, May 13, 2004, pp. 1037-1044.*

Wolz, Ursula, et al., "r-Music, A Collaborative Music DJ for Ad Hoc Networks", WEDELMUSIC '04, Sep. 13-14, 2004, pp. 144-150.*

Crossen, Andrew, et al., "Flytrap: Intelligent Group Music Recommendation", RIDE-VE '99, Sydney, Australia, Mar. 23-24, 1999, pp. 148-155.*

Torrens, Marc, et al., "Visualizing and Exploring Music Libraries", Universitat Pompeu Fabra, © 2004, pp. 1-8.*

Maniar, Nipan, et al., "Dynamic Streaming Media—Creating Custom Programmes in Real-time", ACE '04, Singapore, Jun. 3-5, 2004, p. 349.*

Notification Concerning Transmittal of International Preliminary Report on Patentability (PCT/US2006/006687).

Notification of Transmittal of The International Search Report and the Written Opinion of The International Searching Authority, Or The Declaration (PCT/US06/07124).

Notification of Transmittal of The International Search Report and The Written Opinion of the International Searching Authority, Or the Declaration (PCT/US06/06685).

International Search Report (PCT/US06/06440).

Notification Concerning Transmittal of International Preliminary Report on Patentability dated Oct. 4, 2007 PCT/US06/006440.

Notification Concerning Transmittal of International Preliminary Report on Patentability dated Sep. 20, 2007 PCT/US06/006934.

Notification of Transmittal of The International Search Report and the Written Opinion of the International Searching Authority, or the declaration dated Oct. 19, 2007 PCT/US06/06683.

International Preliminary Report on Patentability (PCT/US2006/006932); Mar. 17, 2009; 7 pages.

Brown, Janelle; "MP3 free-for-all"; [Online] XP002219000; Retrieved from the Internet http://groups.google.com/groups?selm=Pine.GSU.4.10.10002050020300.16171-100000%40adore.lightlink.com&output=gplain; retrieved on Oct. 30, 2002; 6 pages.

Epema D. H. J. ,et al."Music2Share-Copyright-Compliant Music Sharing in P2P Systems" Proceedings of The IEEE, col. 92, No. 6; Jun. 1, 2004; pp. 961-970.

Supplementary Search Report EP 06 73 6092.5 dated Aug. 20, 2009; 3 pages.

Guterman, Jimmy: "Will AOL Tame Aimster?-file sharing system piggyback's on AOL instant messaging-Company Business and Marketing"; [Online] XP002532806; Dec. 18, 2000; Retrieved from the Internet http://findarticles.com/p/articles/mi_mOHWW/is_51_3/ai_68156286/ retrieved on Jun. 18, 2009; 3 pages.

Yang B. et al; "Comparing Hybrid peer-to-peer systems" Proceedings of the 27th VLDB Conference, Roma, Italy; Sep. 11, 2001; pp. 561-570.

Supplementary Search Report EP 06 73 6090.9 dated Jun. 18, 2009; 3 pages.

Bassoli, Andrea, et al., "tunA: Local Music Sharing with Handheld Wi-Fi Devices", Proc. of the 5th Wireless World Conf. 2004, pp. 1-23.

Pachet, Francois, et al., "Content Management for Electronic Music Distribution", Communications of the ACM, vol. 46, Issue 4, Apr. 2003, pp. 71-75.

Swain, Michael J. "Searching for Multimedia on the World Wide Web", IEEE Conf. on Multimedia Computing and Systems, vol. 1, Jun. 7-11, 1999, pp. 32-37.

Lienhart, Rainer, et al., "Improving Media Services on P2P Networks", IEEE Internet Computing, vol. 6, Issue 1, Jan.-Feb. 2002, pp. 73-77.

Davies, Nigel, et al. "Supporting Adaptive Video Applications in Mobile Environments", IEEE Communications Magazine, vol. 36, issue 6, Jun. 1998, pp. 138-143.

Macedonia, Michael, "Distributed File Sharing: Barbarians at the Gates?", Computer, vol. 33, Issue 8, Aug. 2000, pp. 99-101.

Swierk, et al. "The Roma Personal Metadata Service", Mobile Networks and Applications, vol. 7, No. 5, Oct. 2002, pp. 407-418.

Qian, Yuechen, et al. "Exploring the Potentials of Combining Photo Annotating Tasks with Instant Messaging Fun", MUM 2004, College Park, MD, Oct. 27-29, 2004, pp. 11-17.

Regan, Tim, et al. "Media Center Buddies: Instant Messaging Around a Media Center", NordiCHI '04, Tampere, Finlad, Oct. 23-27, 2004, pp. 141-144.

Gottesman, Ben Z., "IM Your Photos", PCMag.com, Dec. 11, 2003, pp. 1-2 (downloaded from www.pcmag.com/print_article2/0,1217,a=114405,00.asp).

Bassoli, Arianna et al., "TunA: A Mobile Music Experience to Foster Local Interactions", UbiComp 2003, Seattle, WA, Oct. 12-15, 2003, pp. 1-2.

Grinter, Rebecca E., et al., "Instant Messaging in Teen Life", CSCW'02, New Orleans, LA, Nov. 16-20, 2002, pp. 21-30.

Qian, Yuechen, et al. "Turning Photo Annotating Tasks into Instant Messaging Fun: Prototyping, User Trials and Road Mapping,"ICEC 2004, LCNS 3166, vol. 3166/2004, Springer, Berlin, Aug. 4, 2004, pp. 610-613.

Coursey, David, "My Favorite Ways to Share Digital Photos", ZDNet, Nov. 7, 2003, pp. 1-3 (downloaded from reviewzdnet.com/AnchorDesk/4520-7298_16-5103567.html).

Bolcer, Gregory Alan., "Magi:An Architecture for Mobile and Disconnected Workflow", IEEE Internet Computing, vol. 4, Issue 3, May/Jun. 2000, pp. 46-54.

Rajani, Rakhi E., et al., "viewing and Annotating Media with MemoryNet", CHI 2004, Vienna, Austria, Apr. 24-29, 2004, pp. 1517-1520.

Microsoft Computer Dictionary, 4th Edition, Microsoft Press, Redmond, WA, 1999, p. 348.

Bayardo, Roberto J., et al. "Peer-to-Peer Sharing of Web Applications", WWW 2003, Budapest, Hungary, May 20-24, 2003, pp. 1-2.

Pachet, Francois, et al. "Popular Music Access: The Sony Music Browser", Journal of the American Society for Information Science and Technology, vol. 55, Issue 12, May 13, 2004, pp. 1037-1044.

Liang, Qianhui, et al. "A United Approach to Discover Multimedia Web Services", ISMSE '03, Dec. 10-12, 2003, pp. 62-69.

Microsoft Computer Dictionary, 4th Edition, Microsoft Press, Redmond, WA, 1999, p. 348 and 461.

Imad M. Abbadi, Chris J. Mitchell, "Digital Rights Management Using a Mobile Phone", Aug. 2007, ICEC '07: proceedings of the ninth international conference on Electronic commerce, Publisher. ACM, pp. 185-194.

Hayes, Conor, et al. "Context Boosting Collaborative Recommendation", Knowledge-Based Systems, vol. 17, issues 2-4, May 2004, pp. 131-138.

Tzanetakis, George, "Musescape: A Tool for Changing Music Collections into Libraries", ECDL 2003, LNCS 2769, Springer-Verlag, berlin, Feb. 26, 2004, pp. 412-421.

Cano, Pedro, et al. "MTG-DB: A Repository for Music Audio Processing", WEDELMUSIC '04, Sep. 13-14, 2004, pp. 2-9.

Vinet, Hughes, et al. "The Cuidado Project", IRCAM, 2002, pp. 1-7.

Microsoft Computer Dictionary, 5th Edition, Microsoft Press, Redmond, WA, 2002, pp. 19, 410, 539 and 542.

Stauffer, "How to do everything with iTunes for Macintosh and Windows." published Feb. 27, 2004, 11 pages.

Mac Observer. "iTunes 4 Tip-Sharing iTunes libraries over IP; It's not just for Rendezvous". published Apr. 29, 2003 to MacsOberver.com; 2 pages.

Lee, Kyung Hee, et al., "Requirements and Referential Software Architecture for home Server based Inter-Home Multimedia Collaboration Services", IEEE transactions on Consumer Electronics, vol. 50, Issue 1, Feb. 2004, pp. 145-150.

Haneef, Anwar M., et al., "ANMoLe-An Adaptive Multimedia Content Delivery Middleware Architecture for Heterogenous Mobile Multi-Device Neighborhoods", Multimedia Tools and Applications, vol. 22, No. 2, Feb. 2004, pp. 171-186.

* cited by examiner

SYSTEM AND METHOD FOR CREATING A COLLABORATIVE PLAYLIST

CROSS-REFERENCE TO RELATED APPLICATION

This application claims the benefit of U.S. Provisional Application Ser. No. 60/657,222, filed Feb. 28, 2005, entitled A SYSTEM AND METHOD FOR DELIVERING MEDIA OVER A NETWORK, and U.S. Provisional Application Ser. No. 60/678,718, filed May 5, 2005, entitled A SYSTEM AND METHOD FOR DELIVERING MEDIA OVER A NETWORK, both of which are hereby incorporated herein by reference.

FIELD OF THE INVENTION

The present disclosure relates generally to a method, server, and user interface associated with creating a collaborative playlist between one or more users based on user interaction with a media program. In one embodiment, the media program forms a part of instant messaging (IM) application.

BACKGROUND OF THE INVENTION

Current technology allows for individuals to create their own playlist of media files and/or media file identifiers. For example, media management and playing applications allow a user to compile a particular set of media files into a playlist or playlist usable to play media files The individual can further manipulate the playlist by re-arranging, deleting, and editing this playlist as desired. However, there lacks a system and method for allowing an individual to collaboratively create a playlist with other users in real-time. Moreover, there lacks a system and method for allowing an individual with at least one other user to essentially simultaneously view the collaborative playlist as it being built. Further, there lacks a capability to allow the participants to discuss and communicate about the playlist they are creating in real-time.

SUMMARY OF THE INVENTION

Thus, the present disclosure addresses these failings. Specifically, in one embodiment, the present disclosure relates to a system, method, and user interface for creating a collaborative playlist, in real-time, of media content, media files, and/or media file identifiers between two or more users. The embodiments herein can be implemented in a variety of ways, by way of non-limiting example, as a plug-in or extension to existing media player applications, as part of existing messaging platforms, or as an individual application.

The present disclosure relates to a system, method, and user interface for creating a collaborative playlist usable to play media files between two or more users. As used herein, the terms "content", "media", or "media files" are used broadly to encompass any type or category of experienceable, retrievable, filed and/or stored media, either singly or collectively, and individual items of media or content are generally referred to as entries, songs, tracks, items or files, however, the use of any one term is not to be considered limiting as the concepts features and functions described herein are generally intended to apply to any storable and/or retrievable item that may be experienced by a user, whether aurally, visually or otherwise, in any manner now known or to become known. Further, the term media includes all types of media such as audio and video.

In one embodiment, a method for creating a collaborative playlist comprises establishing, a communication between a first user at a first computing device and a second user at a second computing device, then providing, for display on each of the first computing device and the second computing device a playlist application accessible by both the first user and the second user for essentially simultaneous interaction by the users with a playlist creation tool for collaboratively creating a playlist usable to play media files and then accepting a media file identifier selected by either one or both of the users for inclusion on the playlist.

In one embodiment, the playlist usable to play media files is a playlist comprising media files and/or media file identifiers wherein the user can access the contents of the media files associated with the media file identifiers.

In one embodiment, the media file identifier is associated with a media file that is identified by the media file identifier. In another embodiment, the media file identifier is acquired from a server. In another embodiment, the media file identifier is acquired from the first user's local media library. In another embodiment, the media file identifier is acquired from the second user's local media library. In another embodiment, the media file identifier is acquired from a third user's local media library. In another embodiment, the media file identifier is acquired from the internet. In another embodiment, the media file identifier is acquired from a network.

In a further embodiment, the method further comprises displaying the playlist at each user's computing device. Thus, in one embodiment, each user can save the playlist to each user's respective computing device. In another embodiment, each user can independently edit the playlist from each user's respective computing device. In a further embodiment, wherein upon editing, each user's edits are only displayed on each user's respective computing device.

In one embodiment, the ability of each user to access a media file associated with the media file identifier is governed by a permission level. In one exemplary embodiment, the permission level is associated with the media file. In another exemplary embodiment, the permission level is controlled by a subscription from a service provider.

In one embodiment, the media identifier is a pointer. In another embodiment, the media file identifier is a uniform resource locator. In another embodiment, the media file identifier is user-defined. In another embodiment, the media file identifier is server-defined. In another embodiment, the media file identifier is a genre. In another embodiment, the media file identifier indicates the identity of the contributor of the media file. In another embodiment, the media file identifier identifies a site on a network from which an associated media file may be streamed.

In one embodiment, the media file identifier is associated with a media file and the media file is acquired by downloading the media file to the user's computing device from a remote database of media files. In another embodiment, the media file identifier is associated with a media file and the media file is acquired by locating the media file on either the first user's computing device or the second user's computing device.

In another embodiment, the media file identifier is associated with a media file and the media file is acquired from any of the following, by either streaming the media file to the user, downloading the media file to the user's computing device from a remote database of media files, or locating the media file on either the first user's computing device or the second user's computing device.

In one embodiment, either one or both of the first computing device and the second computing device is a portable media player. In another embodiment, either one or both of the first computing device and the second computing device is a personal digital assistant. In another embodiment, either one or both of the first computing device and the second computing device is a cellular telephone. In another embodiment, either one or both of the first computing device and the second computing device is a personal computer. In further embodiments, the first and/or second computing device can be any combination of the computing devices discussed above. For example, in one embodiment, the first computing device may be a personal computer and the second computing device may be a cellular phone.

In one embodiment, the media file is an audio file. In another embodiment, the media file is a video file. In an alternative embodiment, the media file can be a combination file compatible with a MPEG-21 standard or the like.

In one embodiment, the playlist creation tool comprises a user interface for building the collaborative playlist. In one exemplary embodiment of the playlist creation tool's user interface, the user interface comprises an area for displaying the collaborative playlist. In another exemplary embodiment, the playlist creation tool's user interface comprises an area for displaying the results of a search performed by either one or both of first user and second user. In an alternative embodiment, the playlist creation tool's user interface comprises both an area for displaying the collaborative playlist and area for displaying the results of a search performed by either one or both of first user and second user.

In another embodiment, the playlist creation tool comprises a searching software module that allows either one or both of the users to search for the media file identifier from a media file source. In one embodiment the media file source is an on-demand streaming media file service. In another embodiment, the media file source is either one or both of the user's local media library. In another embodiment, the media file source is a third user's media file library.

In another embodiment, the playlist creation tool comprises a searching software module that allows a user to search by input criteria for at least one media file identifier from a media file source. In one embodiment, the input criteria can be an artist name, an album name, a media file title, a list of recommended media files, and/or a set of highly rated media files.

In one embodiment, the selection of the media file identifier to be included in the collaborative playlist is done via a one-button feature which allows each user to add the media file identifier to be included in the collaborative playlist. In a further embodiment, wherein upon adding the media file identifier to the playlist, the media file identifier is displayed essentially simultaneously on the playlist of each user's computing device.

In one embodiment, the playlist creation tool comprises a browser to permit browsing for media file identifiers from multiple media file sources.

In a further embodiment, the playlist creation tool can comprise any combination of the following: a browser to permit browsing for media file identifiers from multiple media file sources, a one-button feature, a searching software module, an area for displaying the collaborative playlist, and an area for displaying the results of a search performed by either one or both of first user and second user.

In one embodiment, the first user and the second user communicate via a server. In another embodiment, first user and the second user communicate via a network. In another embodiment, the first user and the second user communicate via the internet.

One embodiment discloses a server that distributes data for collaborative playlist creation, the server comprising a communications software module that establishes communication with a first user at a first computing device and a second user at a second computing device and a data distribution software module that receives a first data set associated with a first media file from the first computing device and transmits the first data set to the second computing device, the data distribution software module receiving a second data set associated with a second media file from a second computing device and transmitting the second data set to the first computing device so that the first computing device can identify the second media file to form a playlist that is essentially simultaneously viewed on the first computing device and the second computing device.

In one embodiment, the first media file is found as a result of a search performed by either one or both users. In another embodiment, the second media file is found as a result of a search performed by either one or both users. In a further embodiment, the search at the second computing device is performed by inputting search criteria received at the instant messaging software application on the server from the first computing device.

In one embodiment, the communication is established via an instant messaging application. In an exemplary embodiment, the second computing device receives information about the playlist via the instant messaging software application from the first computing device. Further, in another exemplary embodiment, the first computing device receives information about the playlist via the instant messaging software application from the second computing device.

In one embodiment, the instant messaging application comprises a playlist creation tool. In one exemplary embodiment, the playlist creation tool comprises a user interface on the first computing device and on the second computing device for displaying the playlist.

In one embodiment, either one or both of the first data set or the second data set comprises an identifier. In another embodiment, either one or both of the first data set or the second data set comprises at least a name. In another embodiment, either one or both of the first data set or the second data set comprises a uniform resource locator. In another embodiment, either one or both of the first data set or the second data set comprises a pointer. In one embodiment, the playlist comprises at least the first data set and the second data set.

In one embodiment, the second media file is identified by downloading the media file from the server. In another embodiment, the second media file is identified by streaming the second media file from the server. In another embodiment, the second media file is identified by obtaining the media file from local memory in the remote computing device.

In one embodiment, the computing device is a cellular phone. In another embodiment, the computing device is a portable media player. In another embodiment, the computing device is a personal digital assistant.

In one embodiment, either one or both of the first or second media file is an audio file. In another embodiment, either one or both of the first or second media file is a video file.

In one embodiment, the second user receives an input from the first user indicating criteria to search for the second media file. In one embodiment, the criteria input is a rating. In another embodiment, the criteria input is an artist name. In another embodiment, the criteria input is a media file name.

One embodiment discloses a user interface for an instant messaging application comprising: a first area comprising an area for inputting messages and a conversation area for viewing the exchange of messages; a second area for searching for media file identifiers from a media file source; and a third area for displaying a collaborative playlist. In one embodiment, this collaborative playlist comprises a media file identifier.

In a further embodiment, the instant messaging environment application specifically designed for building a collaborative playlist between two or more users includes a user interface for creating the collaborative playlist. Further, the user interface can include areas or panes which allow for the users to communicate in real-time via instant messaging, and areas for building a collaborative playlist among the users.

In one embodiment, the media file identifier is a pointer. In another embodiment, the media file identifier is a uniform resource locator. In another embodiment, the media file identifier is user-defined. In another embodiment, the media file identifier is server-defined. In another embodiment, the media file identifier is a genre. In another embodiment, the media file identifier indicates the identity of the contributor of the media file. In another embodiment, the media file identifier is associated with a media file, the media file being acquired from either streaming the media file to the user, downloading the media file to the user's computing device from a remote database of media files, or locating the media file on either the first user's computing device or the second user's computing device.

In one embodiment, the collaborative playlist comprises a media file identifier.

In another embodiment, the user interface further comprising a button for initiating the search. In one embodiment, the search is based upon input criteria. In one embodiment, the input criteria is selected via a drop down menu and a corresponding text field box. In one embodiment, the input criteria is an artist name. In another embodiment, the input criteria a media file name. In another embodiment, the input criteria is a list of recommended media files.

In one embodiment, the user interface further comprising a button for adding the media file identifier from the second area to the third area to be included in the collaborative playlist. In one embodiment, the media file identifier can be dragged and dropped into the third area to be included in the collaborative playlist.

In one embodiment, the user interface is displayed at a first user's first computing device and at a second user's second computing device. In a further embodiment, the second area at the first user's computing device is displayed differently than the second user's computing device. In another embodiment, the third area is displayed essentially simultaneously at the first user's computing device and a second user's computing device.

One embodiment discloses a program storage device tangibly embodying a program of instructions executable by a computing device to perform method steps comprising establishing, via an instant messaging application, a communication between a first user at the computing device and a second user at a second computing device; displaying on each of the first computing device and the second computing device a playlist application accessible by both the first user and the second user for essentially simultaneous interaction by the users with a playlist creation tool for collaboratively creating a playlist usable to play media files; and accepting, via the playlist creation tool, a media file identifier selected by either one or both of the users for inclusion on the playlist so as to a collaboratively create the playlist.

One embodiment discloses a computer data signal embodied in a carrier wave comprising instruction for receiving signals transmitted by network entities, wherein at least a subset of the signals comprise code for performing the steps of establishing, via an instant messaging application, a communication between a first user at the computing device and a second user at a second computing device; displaying on each of the first computing device and the second computing device a playlist application accessible by both the first user and the second user for essentially simultaneous interaction by the users with a playlist creation tool for collaboratively creating a playlist usable to play media files; and accepting, via the playlist creation tool, a media file identifier selected by either one or both of the users for inclusion on the playlist so as to a collaboratively create the playlist.

In an alternate embodiment, a method and system allows two or more users of a particular group to receive a collaborative playlist and/or at least one media file.

In further embodiments, once the collaborative playlist is created, the user interface, in conjunction with a media management program, assists each user in managing their playlists.

In one embodiment, the user can manage the playlist by loading and playing the playlist in a media player. In another embodiment, the user can manage the playlist by saving the playlist to their computing device.

In another embodiment, the user can manage the playlist by sending the playlist to another person. In another embodiment, the user can manage the playlist by burning the playlist to a CD. In another embodiment, the user can manage the playlist by transferring the playlist to a portable device. In another embodiment, the user can manage the playlist by rearranging and/or deleting the tracks within the playlist.

In a further embodiment, the user can perform any of the above managing functions in any combination as the user desires. For example, once the playlist is generated, the user can delete tracks from the playlist, play the playlist, and then send the playlist to another user.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

DETAILED DESCRIPTION OF PREFERRED EMBODIMENTS

Figure 1:
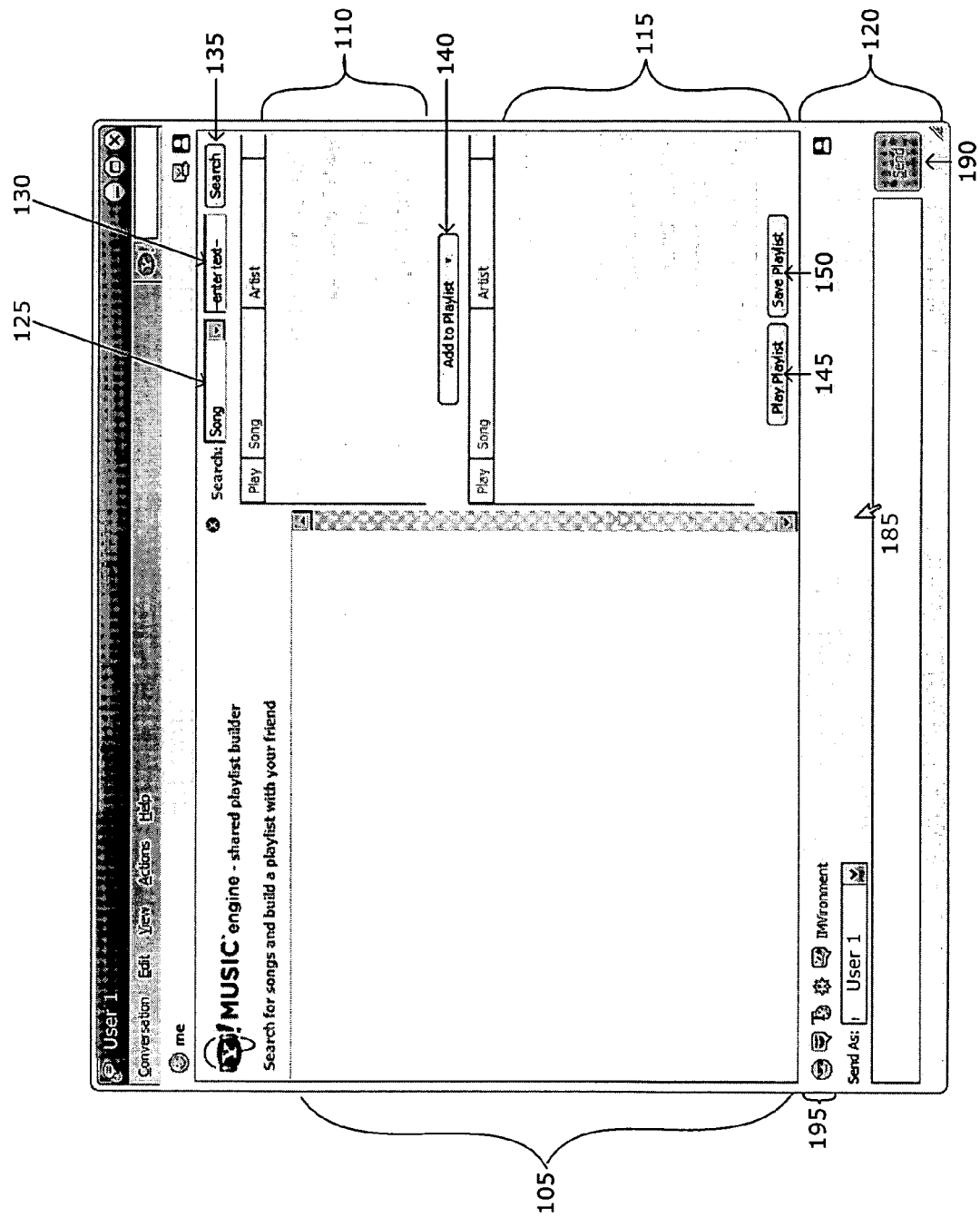
FIG. 1 is an exemplary user interface according to an embodiment of the present disclosure.

In general, the present disclosure includes a method, system, and user interface for creating a collaborative playlist among two or more users. Certain embodiments of the present disclosure will now be discussed with reference to the aforementioned figures, wherein like reference numerals refer to like components.

In one embodiment, a method and system for allowing two or more users to build a collaborative playlist in real-time is disclosed.

In one embodiment, a method for creating a collaborative playlist comprises establishing, via an instant messaging application, a communication between a first user at a first computing device and a second user at a second computing device, then displaying on each of the first computing device and the second computing device a playlist application accessible by both the first user and the second user for essentially simultaneous interaction by the users with a playlist creation tool for collaboratively creating a playlist usable to play media files and then accepting, via the playlist creation tool, a media file identifier selected by either one or both of the users for inclusion on the playlist so as to a collaboratively create the playlist.

In one embodiment, the playlist application is displayed as part of an instant messaging environment application. In one embodiment, the playlist application can include a playlist creation tool. In a further embodiment, the playlist application facilitate text messaging. For example, with reference to FIG. 1, the playlist application's user interface could include any combination of areas 105, 110, 115, and/or 120, described herein.

In one embodiment, the playlist creation tool can include a user interface. In one embodiment, the playlist creation tool can include an area for searching for media file identifiers and for displaying the search results. In a further embodiment, the playlist creation tools' user interface comprises an area for displaying the collaborative playlist as it is being built. In another embodiment, the playlist execution tool can comprise a button for serving the collaborative playlist to a user's computing device. In another embodiment, the playlist creation tool can comprise a button for adding the selected media files found in the search into the area for displaying the collaborative playlist. In another embodiment, the playlist creation tool's user interface can include any combination of the areas and features discussed above. For example, in FIG. 1, the playlist creation tool can comprise both a playlist creation area which displays the search results 110 and an area for displaying the collaborative playlist as it is being built 115. Or, in another exemplary embodiment, the playlist creation tool's user interface could solely comprise an area for displaying the collaborative playlist 115 as it is being built as depicted in FIG. 1.

In another embodiment, two or more users can build a collaborative playlist through a instant messaging environment application. Typically, Instant Messaging (IM) refers to any real-time or any near real-time messaging or information exchange system. Further, an instant messaging environment application allows users to share a particular environment or application among themselves while still allowing for instant messaging capabilities. Instant messaging environment applications and their supporting backend systems and system configurations are disclosed, for example, in U.S. application Ser. No. 09/930,978, published Oct. 28, 2004 as U.S. Publication No. 20040215731, entitled "Instant Messaging Environments" the content of which is hereby incorporated herein by reference in its entirety.

In an alternate embodiment, a method and system allows two or more users belonging to a particular group to receive the same collaborative playlist usable to play at least one media file from a sending user or entity. For example, the sending user or entity could be any type of user or entity including a disc jockey, a celebrity, a recording label, a company, a radio station, a musician, and/or a producer. The user group could be constructed from a sign-up forum or from the sending user's messenger distribution list.

In one exemplary embodiment, the two or more users participating in the collaborative playlist could be a part of a particular group as a result of being a part of a user's instant messaging contacts. In an alternate embodiment, the two or more users could be a part of a particular messenger group as a result of the users' signing up to a particular group or list. For example, fans of a particular genre could sign up to receive and participate in building playlists along with other users who also enjoy that particular genre. Thus, through the present system and method, the sending user or entity can send a collaborative playlist to each user in the particular group.

In a further embodiment, the playlist application for building a collaborative playlist between two or more users includes a user interface. In one embodiment, the playlist application includes a user interface which allows one or more users to build a collaborative playlist together while in an instant messaging environment. One exemplary embodiment of a user interface for building a collaborative playlist in an Instant Messaging environment is described in detail further below.

Figure 8:
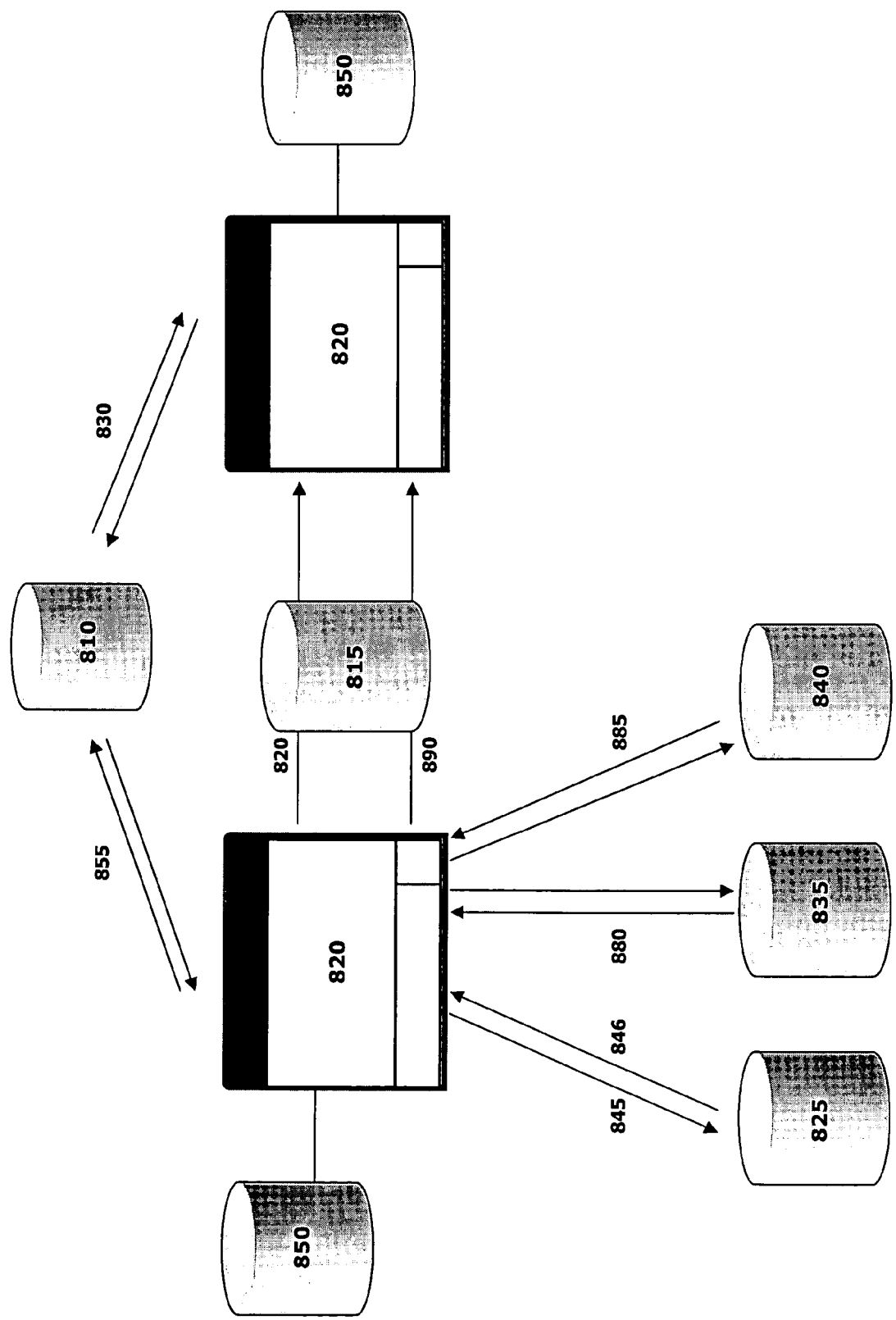
FIG. 8 is an exemplary system architecture according to an embodiment of the present disclosure.

FIG. 8 depicts an exemplary overall system of one embodiment for creating a collaborative playlist among two or more users. As can be seen in FIG. 8, first, from a computing device, a user 805 selects the playlist application 850 for building the collaborative playlist. The computing device can be any device capable of performing the functions described herein, for example devices such as a local computer, a cellular phone, a portable media device, a personal digital assistant, or any device with the processing power and the ability to communicate with other remote users. Thus, a collaborative playlist could be built between two or more users where the users can utilize any combination of computing devices. For example, a first user could build a collaborative playlist from a cellular phone while a second user could build the playlist from a portable media device.

Figure 2:
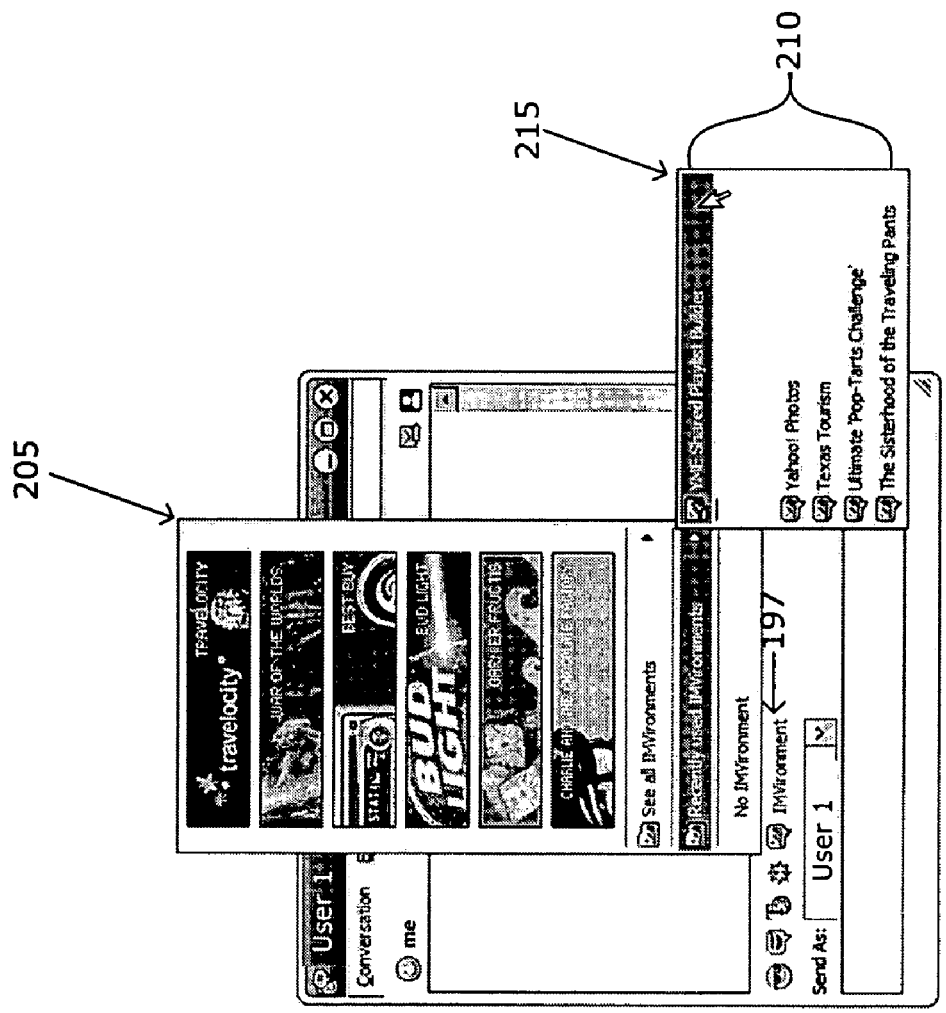
FIG. 2 is an exemplary user interface according to an embodiment of the present disclosure.

A user can access the application for building the collaborative playlist in various ways. For example, the user can access a drop down menu, button, or tab located on the user interface of his or her local instant messaging program. In one exemplary embodiment, as stated above, a user can access the collaborative playlist application 850 by selecting a particular button or drop down menu on a user interface. Referring additionally to FIG. 2, which depicts an example of a user interface of a messaging application incorporating the features and functions described herein, button 197 could when clicked invoke a drop down menu listing environment application choices such as the collaborative playlist environment application. As can be seen in FIG. 2, once the user selects a button 197, a menu 205 appears. For example, in FIG. 2, the menu 205 lists recent IM applications and all IM environment applications. In one embodiment, the playlist application can be included in this menu. From this menu 205, the user can click on or toggle over one of the listed application choices and another drop down menu 210 will appear, listing the collaborative playlist application. The collaborative playlist application is named "YME Shared Playlist Builder". Thus, the user can initiate the collaborative playlist application by selecting the choice 215.

With reference once again to FIG. 8, after a user selects the application 850 for building the collaborative playlist, then the application is requested 855 from an application server

810. Then, the server 810 downloads the requested application for display via the user's local instant messaging program user interface 805.

In a further embodiment, the collaborative playlist application could be stored in a user's computing device (not shown) to avoid the necessity for downloading.

Next, via an instant messaging server 815, or directly via peer-to-peer communication, the user sends a message to another user's instant messaging program user interface 820 which includes a command to invoke the collaborative playlist application. Then, the environment server 810 will download the requested application 830 to another user's local instant messaging program user interface 820. At this point, both users will have the collaborative playlist application loaded on their respective computing devices. In one embodiment, the collaborative playlist application will be loaded in its initial state onto each user's instant messaging user interface. Thus, once the collaborative playlist application is loaded onto each user's computing device, the users can begin to collaboratively build a playlist using the collaborative playlist application's user interface. (See FIGS. 3 through 7 and 9 and 10, described further herein.)

In one embodiment, the user interface for the collaborative playlist application in an instant messaging embodiment is displayed in a window having one or more panes, areas, or hierarchy of menus, depending on the user's needs or designer's choices. For example, in an alternate embodiment, where the computing device may have a limited display area, such as in a cellular phone, the areas, panes, or hierarchy of menus will preferably be arranged so as to properly fit within the display or could be arranged in a particular order so that the user could easily navigate through the user interface to build the collaborative playlist. Thus, the layout and number of panes or areas can vary depending on the user's needs. One exemplary embodiment of a user interface for the collaborative playlist environment application in an instant messaging environment is depicted in FIG. 1. The user interface as depicted in FIG. 1 is an exemplary interface as viewed by a user engaging in creating a collaborative playlist. As can be seen in FIG. 1, the user interface is divided into four panes or areas. A conversation area pane 105, a text input area pane 120, a pane for displaying the playlist creation or workspace or the results of a search 110, and a pane for displaying resulting collaborative playlist 115.

In a manner known in the art the conversation area pane 105 displays all the typed text messages in real-time as they are exchanged between the users. In one aspect, this area pane 105 is a history window, viewable by both users, which contains the messages that have been exchanged in the past between the users. Thus, through the conversation area pane 105, both users can engage in conversation, view the typed conversation in real- or near real-time, and view the past exchanged messages.

Also in a manner know in the art the text in the area pane 120 is a space where the user can type in and input text to send to the other user. Typically, the user types in text and in the field box 185 and then presses a button 190 or key which will send the entered text to the other user while essentially simultaneously displaying to both users the entered text in the conversation area 105. Thus, through the input area 120 and conversation area 105, both users can exchange messages back and forth having a typed conversation in essentially real-time. In one aspect, this allows the users to discuss the potential features, attributes, or any issues surrounding the collaborative playlist (see e.g. FIG. 5). Typically, both users are able to see the same conversation string in their respect conversation area panes 105. Thus, each user is able to give his opinions, advise, suggestions, or comments and contribute in essentially real time with another user to build a collaborative playlist.

In further embodiments, as known in the art, the text input area pane 120 may also include various buttons and menus 195 that activate common messaging functions such as altering the input font, ringing another user, adding sounds or tones, inserting symbols, sending animated flash media, and activating an instant messaging environment application.

In one embodiment, the user interface comprises an area for searching and/or browsing for media file identifiers. For example, FIG. 1 depicts a drop down box 125, a corresponding text field box 130, and a button 135 that causes the application to initiate a search. Together, these items (125, 130 and 135) allow each user to search for candidate that may be included in the collaborative playlist. Many variations and combinations of drop down menus or similar and text searches are contemplated as playlist creation tools. The functionality of creation tools can be incorporated in the playlist application or be distributed or shared among other applications that the playlist application interacts with or plugs into, such as media player applications, media file read applications online media services, subscription services, streaming services and the like.

Figure 9:
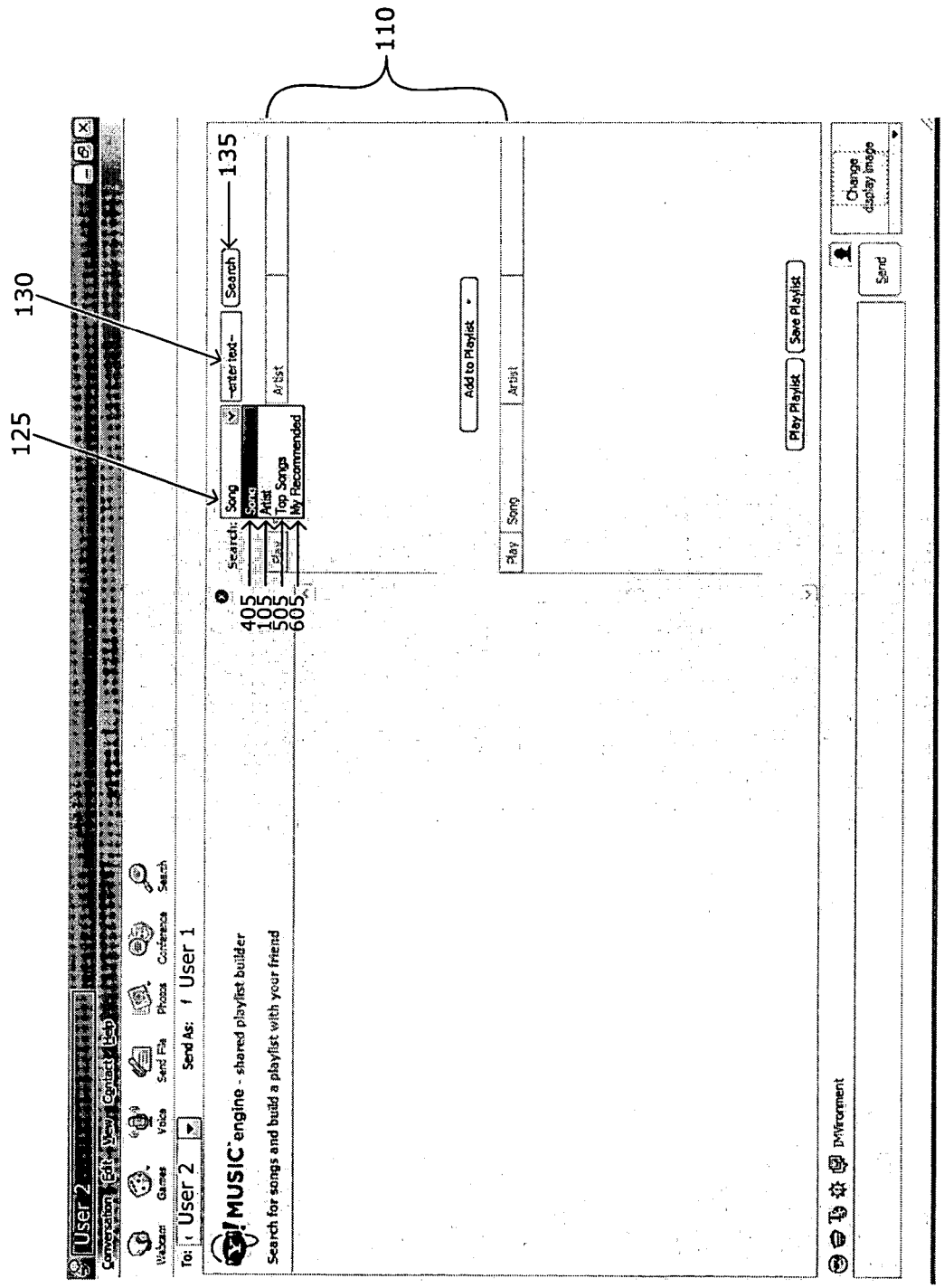
FIG. 9 is an exemplary user interface according to an embodiment of the present disclosure.

In one embodiment, the drop down box 125 as depicted in FIG. 9 could list search parameters such as a media file's title or song 405, the artist associated with the media file 105, top media files 505, and/or a particular list of recommended media file 605. In an alternate embodiment, the user can initiate a search of media files by a particular rating, a media file tag, another user's Id, or any other indicia correlated to a media file such as a media file identifier. Turning back to FIG. 1, once the user has selected a parameter from the drop down menu 125, the user can enter corresponding text into the text field box 130. Next, the user initiates the search by selecting button 135. Then, the search results, which may be a list of media file identifiers, are displayed in the playlist creation or workspace pane 110.

Figure 3:
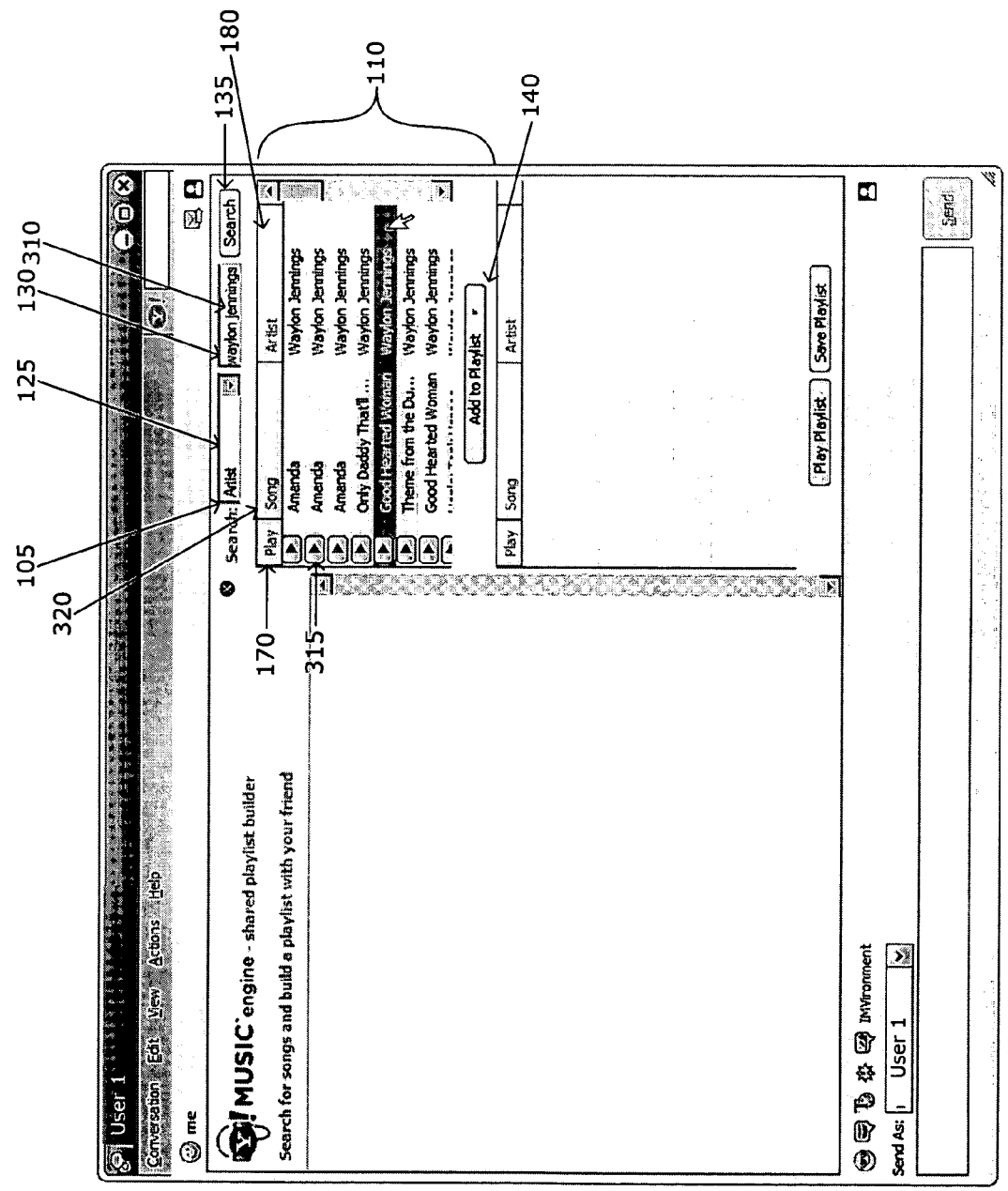
FIG. 3 is an exemplary user interface according to an embodiment of the present disclosure.

One exemplary embodiment illustrating a media file identifier search using a drop down menu box and a text field box is depicted in FIG. 3. As can be seen in FIG. 3, the drop down parameter 105 selected in the drop down menu box 125 is the name of the artist associated with the media file identifier. In embodiments including media files other than audio files, this drop down menu choice could include associated names such as an associated author's name or director's name. Further, as seen in FIG. 3, the user entered corresponding text 310 into the text field box 130. Specifically, the user has entered the artist name "Waylon Jennings" 310 into the text field box 130. Then, the user selected the search button 135 and thus, a corresponding list of media file identifiers is displayed in the playlist workspace pane 110. Accordingly, the list of media file identifiers in FIG. 3 includes all the media files identifiers which list or name Waylon Jennings as the artist depending on the sources searched.

The playlist collaboration application can initiate a search of media file sources such as the user's personal library of media files, an on-demand streaming media file service, another user's media library, a network and/or, the internet. It is contemplated that the user can initiate search for media files from a mixture of media sources. For example, at times, the user may want search for media files and/or media file identifiers solely from his or her own local media library files. At other times, the user may want to search solely from an on-demand streaming media service that can provide the user access to tens of thousands of media files and/or media file identifiers. Furthermore, the user may want to search from a mixture of two or more sources such as local media library and on-demand streaming service. Moreover, a user may want to only create a collaborative playlist with the other participating user's media library.

In one embodiment, with reference once again to FIG. 8, when a user implements a search request 845 by artist name 825, the system queries a music search service database 825 that returns the results 846 to the user's environment application 850 for building the collaborative playlist. In a further embodiment, when a user searches by artist name, the system searches the user's local media files and/or a music service database are queried and the results are returned to the user's playlist workspace pane 110.

Figure 4:
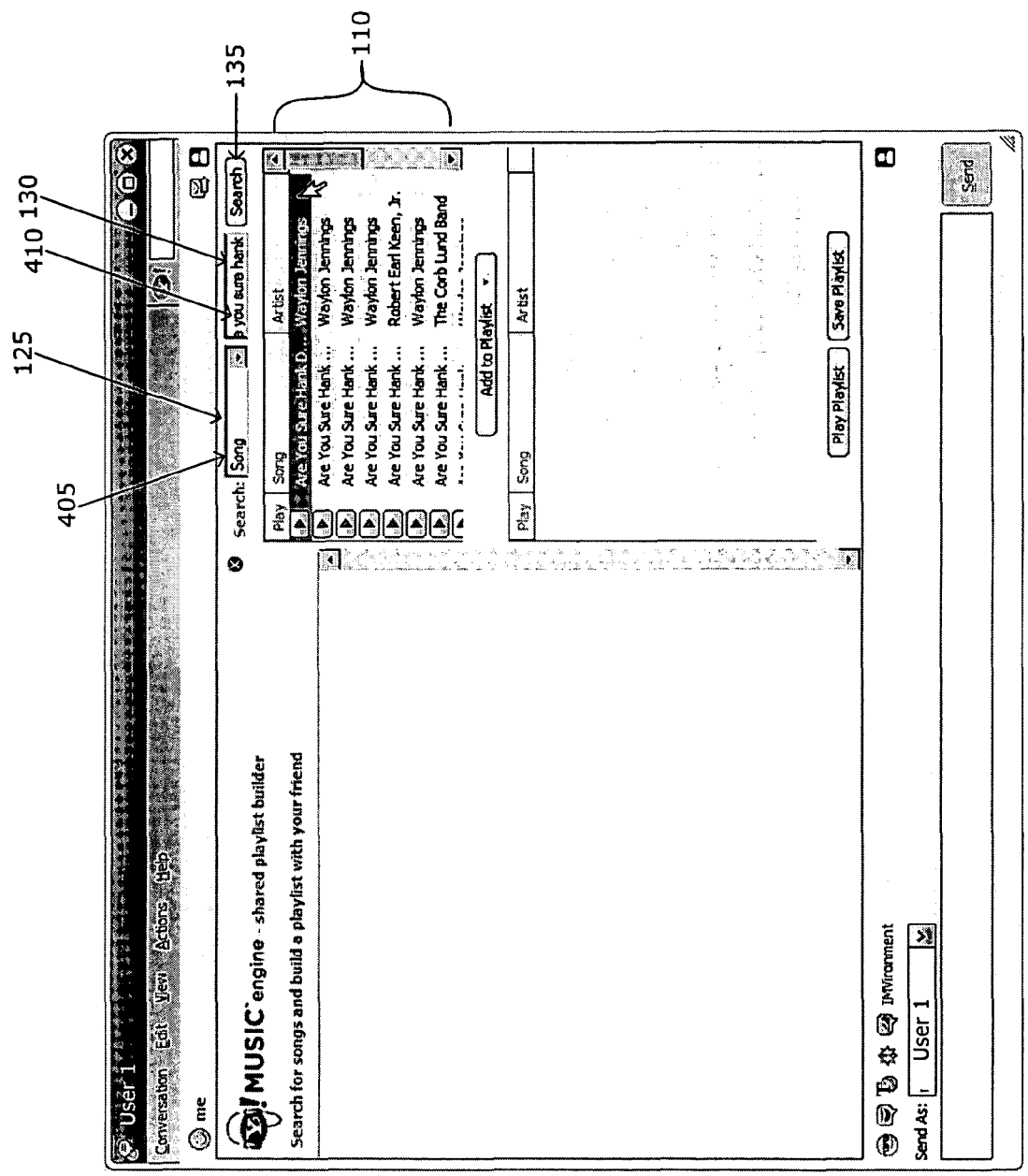
FIG. 4 is an exemplary user interface according to an embodiment of the present disclosure.

Another exemplary embodiment illustrating a media file and/or media file identifier search using a drop down menu box and a text field box is depicted in FIG. 4. As can be seen in FIG. 4, the drop down parameter 405 selected in the drop down menu box 125 is the name of the song associated with a media file. In embodiments including media files and/or media file identifiers other than audio files, this drop down menu choice could include associated media file titles. Further, the user has entered corresponding text 410 into the text field box 130. Specifically, the user has entered the song name "Are You Sure Hank Done it this Way" 410 into the text field box 130. Then, the user has selected the search button 135 and a corresponding list of media file identifiers is displayed in the playlist workspace pane 110. As stated above, the various sources searched for candidate media files is discussed above. Accordingly, the list of media files in FIG. 4 displayed in the playlist workspace pane 110 includes all or some of the media file identifiers which list or name "Are You Sure Hank Done it this Way" as the song title (regardless of artist) depending on the sources searched.

In one embodiment, referring to FIG. 8, when a user searches 847 by song name or media file title the system searches a music search service database 825 and returns 846 the results to the user's playlist environment application 850. In a further embodiment (not depicted), when a user searches by song name or media file title, the system searches the user's local media files and/or a music service database and returns the results to the user's playlist application.

Figure 5:
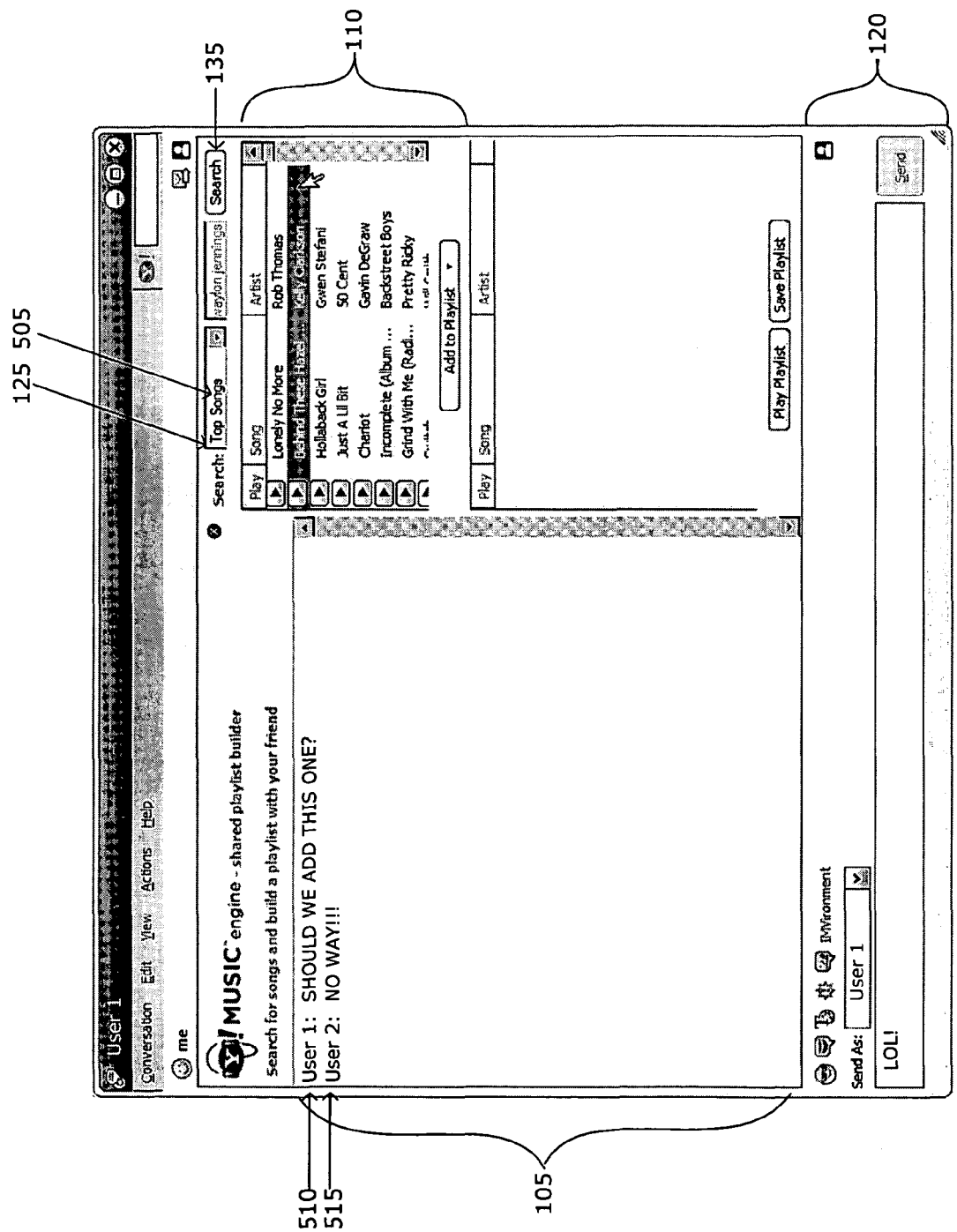
FIG. 5 is an exemplary user interface according to an embodiment of the present disclosure.

Another exemplary embodiment illustrating a media file search using a drop down menu box and a text field box is depicted in FIG. 5. As can be seen in FIG. 5, the drop down parameter 805 selected in the drop down menu box 125 is a top song parameter 505. Meaning, in one embodiment, that the search will be for media files which are considered to be the "top" or highly rated. This rating or evaluation can be accomplished by a rating charts service. For example, a rating charts service would include a database for determining the ratings of the media files and/or media file identifiers. For example, the ratings may be based on user-applied ratings, the frequency that a particular media file and/or media file identifier is played by the user or other users, the frequency that the media file and/or media file identifier is requested by other users, the frequency that the media file and/or media file identifier appears in the user's local media library, third party rating services, for example BILLBOARD, SOUNSCAN and the like, or any combination thereof. In embodiments including media files and/or media file identifiers other than audio files, this drop down menu choice would also extend to highly rated media files with respect to their particular categories. For example, for video files, this menu choice could search all the top rated music videos. Consequently, in one embodiment, the user does not need to enter a corresponding text entry. This is because simply selecting the top songs parameter 505 from the menu 125 and selecting the search button 135 will display a top list of media files and/or media file identifiers in the playlist workspace pane 110.

In addition, referring to FIG. 8, when a user initiates a search 885 by a list of top media files, the system queries a charts service 840 that returns 847 the results to the user's playlist workspace pane 110.

Figure 6:
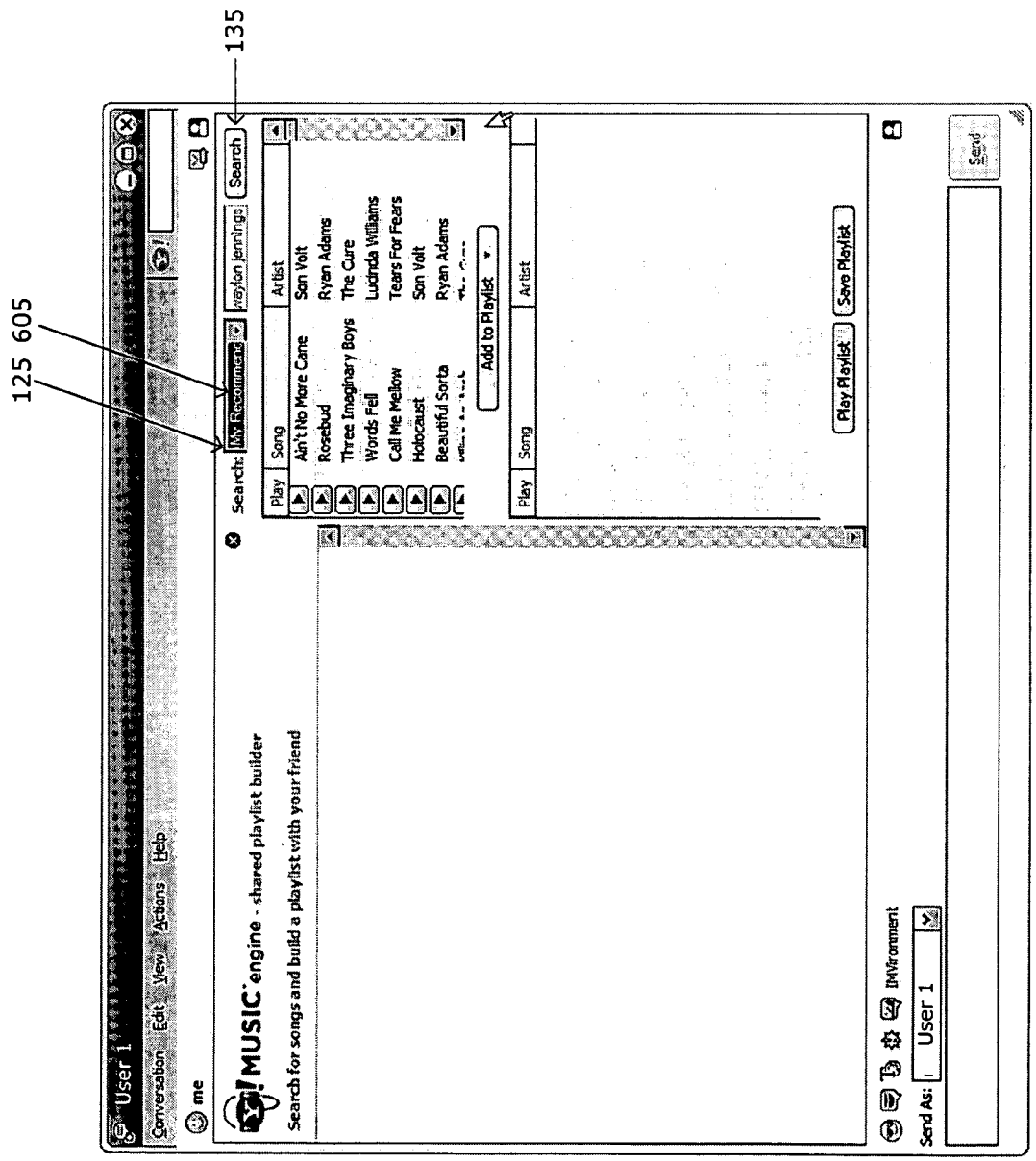
FIG. 6 is an exemplary user interface according to an embodiment of the present disclosure.

Another exemplary embodiment illustrating a media file search of recommended media files using a drop down menu box and a text field box is depicted in FIG. 6. As can be seen in FIG. 6, the drop down parameter selected in the drop down menu box 125 is a list of recommend media files parameter 605. In one embodiment, the user does not need to enter a corresponding text entry. This is because simply selecting the recommended list choice from the menu and selecting the search button 135 will result in the display of a recommended list of media files and/or media file identifiers in the playlist workspace pane 110. In one embodiment, the recommended media files is a list of locations where the user can look to find media files and/or media file identifiers. In this embodiment, the user has the choice to search by artist or track name, or to select from a generated list of charts or recommendations. In one embodiment, the generated recommendation lists are created by a charts media file service and/or recommendation engine.

In addition, referring to FIG. 8, when a user searches 880 by recommendations, a query sent to search a recommendations service database 835 that returns 847 the results to the user's environment application 850 for building the collaborative playlist. In further embodiments, the recommendations can be influenced by a user's ratings of media files which may be associated with each user's id and stored on the recommendations service database or other connected database. Of course, other ways of searching for media files and/or media file identifiers, not depicted, may be employed. For example, a user could query a search for media files and/or media file identifiers using a relatedness tool which allows the user to highlight or otherwise select content already located in a dedicated pane such as the playlist workspace pane 110 as shown in FIG. 1 and then further populate the pane with content related to the depicted content. In one embodiment, the relatedness tool could be accessed via a drop down menu or button located on the collaborative playlist user interface. Again, the content may an artist, album, track, or genre, era, or release date, or any combination thereof. Specifically, when the user highlights the media file identifier(s) and selects the relatedness tool, the tool queries whether the user wants media file(s) that is similar or dissimilar to the highlighted content. In further embodiments, the user can select queries for media files and/or media file identifiers based on different scales of relatedness. For example, the scale of relatedness can be based on multiple levels of similarity and dissimilarity. Once the user responds, the relatedness tool acts on the input and populates the dedicated pane with the appropriate media files and/or media file identifiers. In an alternate embodiment, the relatedness tool may populate the playlist workspace pane from various sources such as the user's local media library, on an on-demand streaming media, another user's media library, a network, the internet, or any other source of content that the user has access to. Thus, the relatedness tool allows the user to automatically and quickly expand the potential media files and/or media file identifiers used for the collaborative playlist.

In one embodiment, the tool is dedicated to randomly select media files and/or media file identifiers from the user's local media library. In another embodiment, the tool selects content from the user's local media library based upon the popularity of the media files, based on the media files' ranking, based upon the degree of frequency the media files and/or media file identifiers are played, or any other basis for selecting media files and/or media file identifiers from a local user library. Thus, the tool assists the user in choosing content and can further streamline the playlist generation process. For example, if the user cannot remember the media file in their local media file library or simply does not have the time, the user can select the tool which will quickly provide the user with media file and/or media file identifier. The user can use this tool as many times as necessary to retrieve the desired content. Accordingly, each time the user selects the tool, different media file identifiers will be displayed for the user in the text field box.

In another embodiment, instead of entering media file identifiers into the text field box, the user can select media files and/or media file identifiers by clicking a tool which will select and automatically populate the text field box for the user. For example, the user could enter the first three characters of an artist name or media file title, then the system could complete the search term and populate the field box.

It should be noted that in one embodiment, with reference to FIG. 1, unlike the conversation area pane 104 and the resulting playlist pane 115, the pane for displaying the playlist creation workspace 110 is unique to each user. Meaning that the user interface allows each user to view only their particular workspace pane 110 and will differ depending on how the user has constructed their particular media file identifier search. Thus, each user can search for media files independently of the other user and without displaying this workspace pane to another user. However, as stated above, the conversation area pane 105 and the resulting playlist pane 115 are the same for all users and are displayed essentially simultaneously and in essentially real-time. Therefore, through the user interface, each user can view his/her own playlist workspace pane 110 and perform his/her own search for media files. But all users can essentially simultaneously view the conversation area pane 105 and resulting playlist pane 115. Of course, other embodiments contemplate many combinations of what areas are displayed to all users and which areas are only displayed to each respective user.

Regardless of what search input criteria is selected, once the user selects the button which will cause the environment application to initiate or perform a search of all media file identifiers, the results are displayed in the playlist creation or workspace pane. In one embodiment, with reference to FIG. 1, each user can delete and otherwise edit any number of media file identifiers within the playlist creation workspace pane 110 as the user desires.

Figure 7:
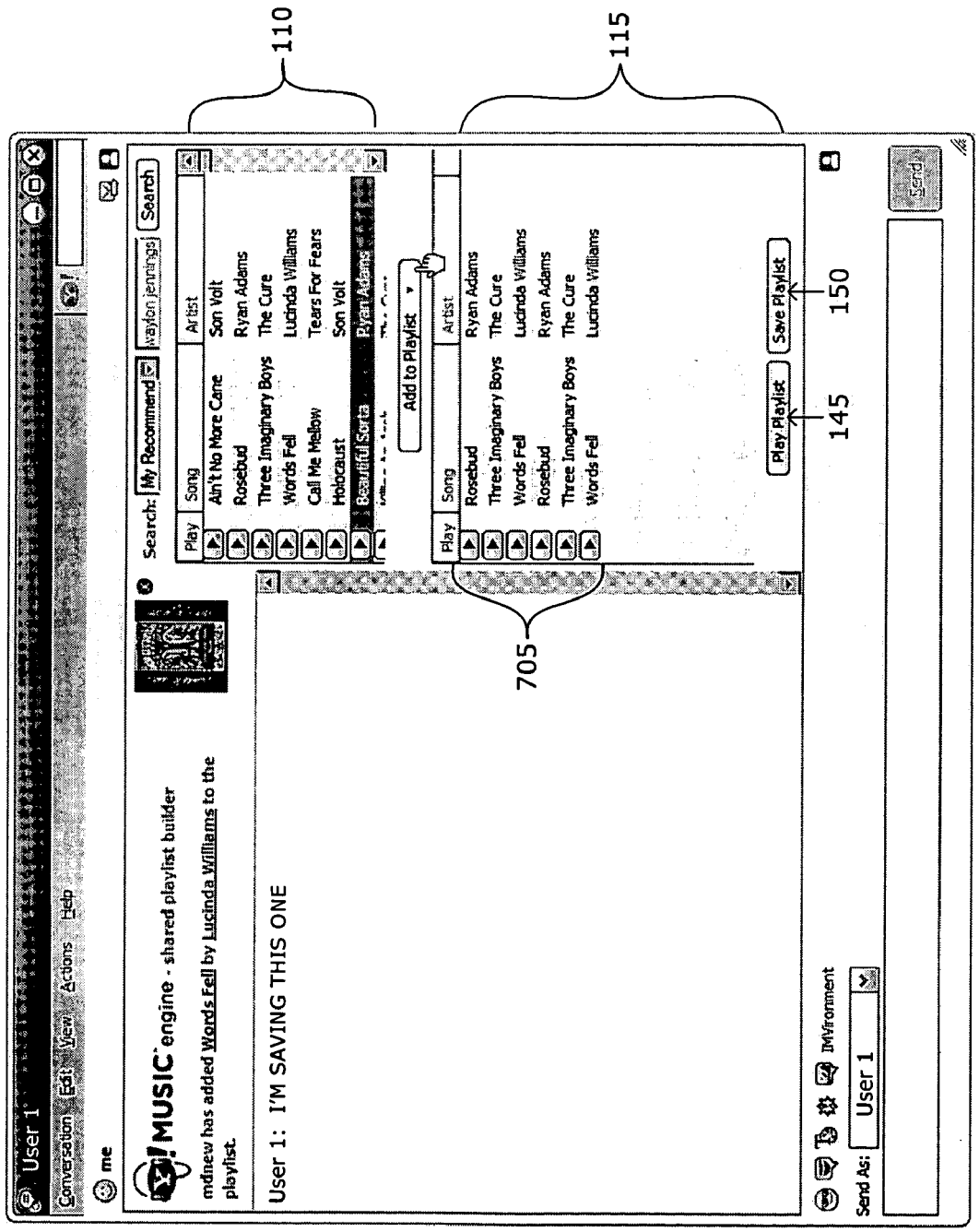
FIG. 7 is an exemplary user interface according to an embodiment of the present disclosure.

In one embodiment, as depicted in FIGS. 1, 3, 4, 5, and 6 the playlist creation workspace 110 further includes columns for organizing and identifying each media file identifier. For example, referring to FIG. 3, the playlist creation workspace 110 includes three columns; a play column 170, a column for displaying each media file's and/or media file identifiers respective song title or media file title 320, and a column for displaying each media file's and/or media file identifiers respective associated artist 180. The play column 170 includes a play button 315 associated with each media file identifier. In one embodiment, selecting the play button 315 associated with a media file identifier will preferably cause the media file associated with the displayed identifier to be played by a media player (not shown). In one embodiment, a new media management program or application will automatically launch and load the play the media files. Further the workspace 110 pane includes a button 140 for adding a media file and/or media file identifier to the collaborative playlist 705 (FIG. 7). In further embodiments, the user can select as many media files and/or media file identifiers as the user desires. Thus, the user can highlight or otherwise select at least one media file identifier displayed in the workspace pane 110 and then click a button 140 to add those media file(s) and/or media file identifiers to be included in the collaborative playlist. In an alternate embodiment, with reference to FIG. 1, the user may select the media file identifiers by dragging and dropping the media file and/or media file identifiers from workspace pane 110 into the resulting collaborative playlist pane 115. In yet another embodiment, the user selects media file identifiers by dragging and dropping media file(s) from a separate window or application (separate from the collaborative playlist user interface window) displaying media file identifiers. For example, this separate window can display media file identifiers from any source such as an on-demand, streaming media service pane, a webpage, or library of media files, or any window of media files and/or media files identifiers capable of being dragged and dropped into the resulting playlist pane.

Referring to FIG. 8, when a user chooses to add a media file identifier to the collaborative playlist, a silent message 890 (e.g. a message sent but not displayed) is sent via the instant messaging server 815, to the other user(s), telling their application 850 to add the media file identifier to their collaborative playlist of their interface (not depicted). Thus, with reference to FIG. 7, once the user adds the media file identifier(s) to the collaborative playlist 705, the selected/added media file identifiers is displayed in the resulting playlist pane 115 of each user. In one embodiment, this display occurs essentially simultaneously. For example, as depicted in FIG. 7, the resulting playlist pane 115 displays a list of media file identifiers 705 the user has selected from the playlist workspace pane 110 to comprise the collaborative playlist. As stated above, each user's local user interface will display the same collaborative playlist in the resulting playlist pane 115 in essentially simultaneously. Thus, in the exemplary embodiment depicted in FIG. 7, the resulting playlist window 115 of each user may include the same playlist 705. In one embodiment, the resulting playlist pane 115 displays the collaborative playlist 705 as it being built. In one embodiment, the collaborative playlist represents a playlist usable to play media files encompassing all forms of media.

In a further embodiment, each user can alter and manage this collaborative playlist on their local collaborative playlist application user interface as they wish without affecting the other user's display of the collaborative playlist. For example, in an embodiment having two users, User 1 and User 2, once User 1 and User 2 have added their respective media file identifiers to the collaborative playlist, those media file identifiers are displayed in each of their resulting playlist panes. User 1 can delete as many media file identifiers from the resulting playlist pane as he or she wishes. However, User 2's collaborative playlist status and display in his resulting collaborative playlist pane remains unaffected by User 1's deletions. Thus, User 1 and User 2 can build the playlist together in a collaborative application, wherein when each user adds a media file identifier, it is reflected in both user's local user interfaces. But, any deletions will only be displayed on the deleting user's local user interface. Of course, alternate embodiments may include many variations of what media file identifier capabilities are displayed among all the users and which ones are not displayed.

In one embodiment (see e.g. FIG. 10), upon highlighting or otherwise selecting a media file identifier, the user interface displays a menu of actions a user can take with respect to the highlighted or selected media file identifier. For example, as depicted in FIG. 10, the user may select a drop down menu 1005 from any highlighted/selected media file identifier in the resulting playlist pane 115.

This drop down menu 1005 can include features and functions such as playing 1110 the particular media file 1140. Further, the drop down menu 1005 can include links to other features and functions relating to a particular media file identifier 1140. For example, the menu 1005 includes a link 1115 which will direct the user to the particular media files' 1140 associated artists' webpage and a link 1120 which will direct the user to the particular media files' 1140 associated song title web page. For example, in FIG. 10, the particular media files 1140 artist is Waylon Jennings. Thus, selecting the "go to artist page" link 1115 can direct the user to Waylon Jennings' web page. Also, the drop down menu 1005 includes a link 1125 to recommend songs similar to the particular media file and/or media file identifier selected. In one embodiment, the system can recommend media files to a user using a recommendations service.

Another feature or link 1130 allows the user to search for further media files and/or media file identifiers 1130 for the particular artist associated with the media file. In one embodiment, if the user selects this link 1130, using a music search service or database, the system will initiate a search for all songs and/or media file identifiers related to that artist. In one embodiment, a returned list of related media files and/or media file identifiers will be displayed for the user in a separate page or a new window pane of the user's interface.

Figure 10:
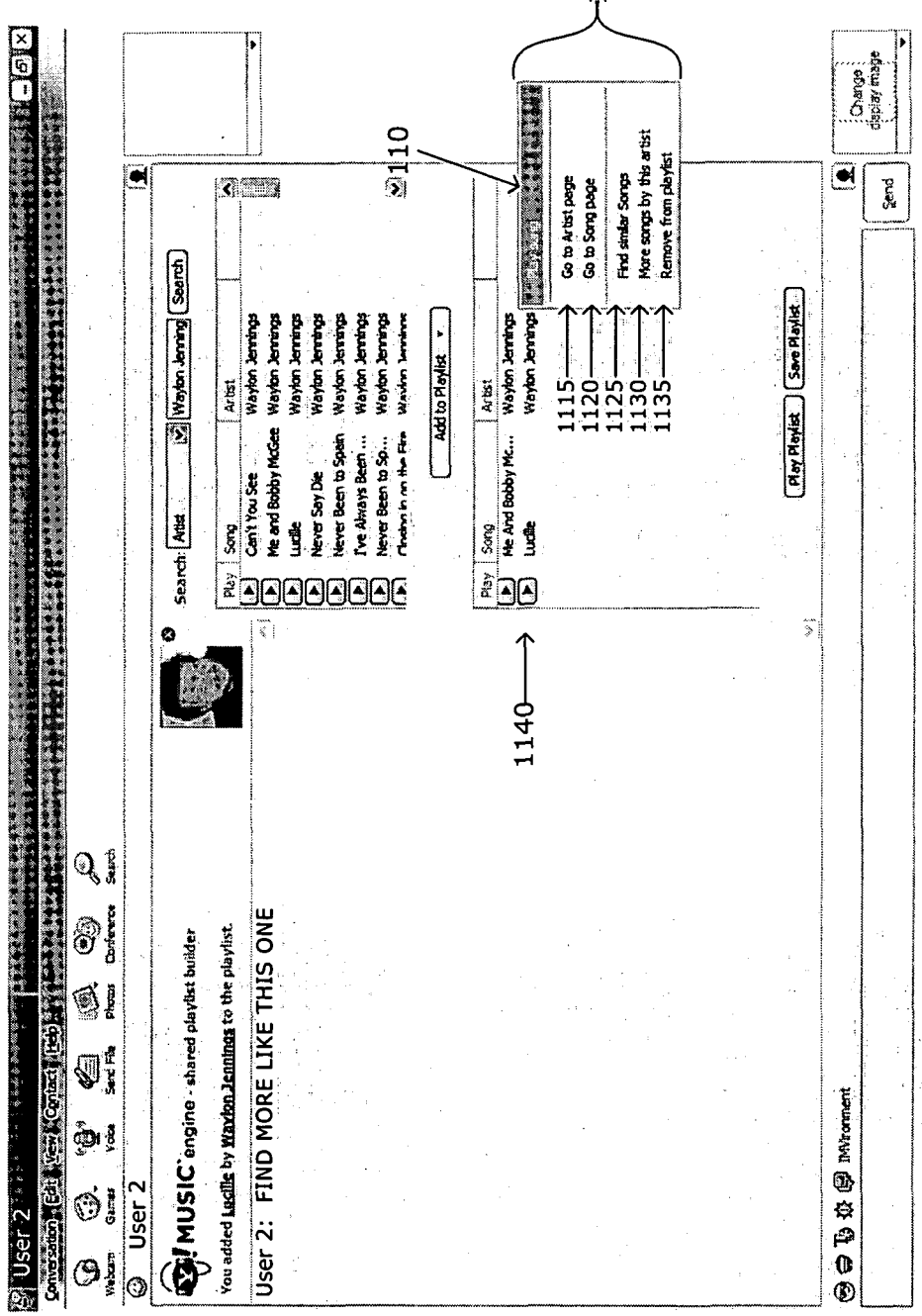
FIG. 10 is an exemplary user interface according to an embodiment of the present disclosure.

Finally, as depicted in FIG. 10, the drop down menu 1005 may allow each user to remove media file identifier from the resulting playlist pane 120.

In one embodiment, with reference to FIG. 5, due to the messaging capabilities of the text input pane 120 and the conversation area pane 105, the users can "converse" back and forth and discuss, in essentially real-time, the building of the collaborative playlist. For example, as depicted in FIG. 5, the conversation area pane 105 displays a conversation 510, 515 between user 1 and user 2. Thus, each user, through the user interface, can search for media files and add media file identifiers to the collaborative playlist, while the users will be able to see the same collaborative playlist (not depicted) and discuss 510, 515 the building of the collaborative playlist as it is being built. Therefore, building the collaborative playlist among at least two users can be an iterative and shared process. This collaborative exchange can occur through traditional text IM or via any enhanced IM feature such as, by way of non-limiting example VoIP over IM video/webcam over IM, and the like.

In a one embodiment, as depicted in FIG. 7, the resulting playlist pane 115 includes a button 145 for playing the collaborative playlist 705 and a button for saving 150 the collaborative playlist 705. In one embodiment, these functions are initiated by each user's command and at each user's computing device. In one embodiment, selecting the "play" button 145 causes a media management program to launch and play the playlist in the user's computing device. Further, selecting the "save" button 150 causes a media management program to launch and save the playlist to a memory of that particular user's computing device. These functions could also be implemented by the software application itself.

Moreover, once the collaborative playlist is created to the user's satisfaction, through a media management program (such as media player like Yahoo! Music Engine or Music-Match), the user can further manage the collaborative playlist. In one embodiment, the following variations and features regarding managing and the collaborative playlist is controlled by the media management program. For example, a media management program's user interface may allow the user to stop, rewind, fast-forward, pause, and or/stop the playing of the playlist. In another embodiment, the user can manage the playlist by rearranging and/or deleting the media files within the collaborative playlist. Further, the user may be able to send and share the collaborative playlist with others.

In one embodiment, the ability to send and share playlists with another user will be dependent on certain Digital Rights Management (DRM). In one embodiment, the playlists created and sent to another user will contain sufficient DRM information to ensure that the user to which the playlist is sent has sufficient rights or a specific permission level to permit that other user to experience the media contained in the playlist. In one embodiment, this function is controlled by the media management program, in one embodiment, the collaborative playlist building environment application does not have to distinguish between subscribing and non-subscribing users.

In one embodiment, the ability of each user to access a media file and/or media file identifier is governed by a permission level. Meaning, in one embodiment, the ability to send, play, view, add a media file and/or media file identifier may be governed by a permission level. In one exemplary embodiment, the permission level is associated with the media file. In another exemplary embodiment, the permission level is controlled by a subscription from a service provider. Rights and permissions can be managed by the application 850 or an associated media management application or media player or combination thereof.

In an exemplary embodiment, the permission level depends on user's status as a subscriber or a non-subscriber to a on-demand-streaming media service (ODSMS). For example, if the user who is adding the media file and/or media file identifier to the collaborative playlist is a subscriber and the user receiving the newly added media file or media file identifier is also a subscriber, then the receiving user can have full access to each ODSMS media file identifier on the playlist.

In another exemplary embodiment of adding a media file identifier, if the user adding the media file identifier to the collaborative playlist is a subscriber to a ODSMS and the receiving user is a non-subscriber, then the receiving user may have limited access to the ODSMS media files. For example, the receiving user may be limited to a pre-determined length clip of each ODSMS media file, such as a 30-second clip when the receiving user plays the media file.

In another example of subscribing-adding-user and a non-subscribing—receiving-user, the receiving user may be given a pre-determined number of times the user can play each ODSMS media file. After this pre-determined number of times has been reached, the user is then limited to a default, pre-determined length of time for each media file (such as a 30-second clip). For example, the non-subscribing, receiving user may be limited to playing a ODSMS media file at its full-length to three times. Thus, once the user had played the media file and/or media file identifier three times, the user can now only listen to 30 second clips of the media file. This allows a non-subscribing receiving user to listen to ODSMS music otherwise not available to the user, while enticing the user to subscribe to the service. Accordingly, in one embodiment, once the user's pre-determined number of full-length plays are used, the user is prompted and has the option to subscribe to the ODSMS.

Of course, these embodiments are not limited to ODSMS media files, but can apply to any media files which require a specified level of sharing and playing access. For example, it could be negotiated that certain media files generally not available for full-length sharing could be shared and played between any status (subscribing or non-subscribing) of users for a pre-determined number of times. For example, if there is a particular artist who wants to promote and/or entice users to listen to their media files, the artist or their representatives can allow a particular media file to be able to be played in a collaborative playlist among any type of users. However, the users are limited to playing the media file to a certain number of times.

In another embodiment, the user can further utilize the collaborative playlist by burning the playlist to a CD or transferring the media files to a portable device. For example, the user can burn the media filed listed in playlist in the media player window to a CD and/or transfer the media files to a portable device by clicking a button and selecting the option from a drop-down menu. In some embodiments, the ability to transfer media files to a portable device or burn media files to a CD may depend on whether the user has specified access to those media files. Particularly, the user may be required to pay for files not located on the user's local media library. For example, the user may be required to pay for files located on an on-demand, streaming media service. Thus, the user may be required to pay a price for each media file before downloading or burning the media files. In another example, the user may be required to be subscriber to a service that allows the user to download and burn media files.

In a further embodiment, the user can perform any of the above managing functions in any combination as the user desires using the media management program. For example, once the playlist is generated, the user can delete media files and/or media file identifiers from the playlist, play the playlist, and then send the playlist to another user.

Those skilled in the art will recognize that the method and system of the present invention within the application, may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

We claim:

1. A method comprising:
    establishing, via instant messaging, a communication between a first user at a first computing device and a second user at a second computing device;
    providing, for display on each of said first computing device and said second computing device, a playlist application accessible by and visible to both said first user and said second user for essentially simultaneous interaction by said first user and said second user with a playlist creation tool, said playlist creation tool enabling said first user and said second user to- collaboratively create a playlist usable to play media files, said playlist being visibly displayed to said first and said second user as it is being collaboratively created; and
    accepting a media file identifier selected by either one or both of the users for inclusion on said playlist.

2. The method of claim 1 wherein said media file identifier is associated with a media file that is identified by said media file identifier.

3. The method of claim 2 wherein said media file identifier is acquired from a server.

4. The method of claim 2 wherein said media file identifier is acquired from said first user's local media library.

5. The method of claim 2 wherein said media file identifier is acquired from said second user's local media library.

6. The method of claim 2 wherein said media file identifier is acquired from a third user's local media library.

7. The method of claim 1 wherein said media file identifier is a pointer.

8. The method of claim 1 wherein said media file identifier is a uniform resource locator.

9. The method of claim 1 wherein said media file identifier is user-defined.

10. The method of claim 1 wherein said media file identifier is server-defined.

11. The method of claim 1 wherein said media file identifier is a musical genre.

12. The method of claim 1 wherein said media file identifier indicates the identity of the contributor of the media file.

13. The method of claim 1 wherein said media file identifier is an artist name.

14. The method of claim 1 wherein said media file identifier identifies a site on a network from which an associated media file may be streamed.

15. The method of claim 1 wherein said media file identifier is associated with a media file that can be acquired by downloading said media file to either one or both of said first and said second computing device from a remote database of media files.

16. The method of claim 1 wherein said media file identifier is associated with a media file that can be acquired by locating said media file on either one or both of said first and said second computing device.

17. The method of claim 1 wherein said media file identifier is associated with a media file that can be acquired by streaming said media file.

18. The method of claim 1 wherein said media file identifier is associated with a media file that can be downloaded to one or both of said first and said second computing device from a remote database of media files.

19. The method of claim 1 wherein said media file identifier is associated with a media file that can be located on either one or both of said first and said second computing device.

20. The method of claim 1 wherein said playlist can be saved to each user's respective computing device, at each user's respective option.

21. The method of claim 1 wherein either one or both of said first computing device and said second computing device comprises a portable media player.

22. The method of claim 1 wherein either one or both of said first computing device and said second computing device comprises a personal digital assistant.

23. The method of claim 1 wherein either one or both of said first computing device and said second computing device comprises a cellular telephone.

24. The method of claim 1 wherein either one or both of said first computing device and said second computing device comprises a personal computer.

25. The method of claim 1 wherein said media file comprises an audio file.

26. The method of claim 1 wherein said media file comprises a video file.

27. The method of claim 1 wherein said playlist creation tool comprises a user interface for building said collaborative playlist.

28. The method of claim 27 wherein said user interface comprises an area for displaying of said collaborative playlist.

29. The method of claim 27 wherein said user interface comprises an area for displaying the results of a search performed by either one or both of first user and second user.

30. The method of claim 1 wherein said playlist creation tool comprises a searching software module that allows either one or both of said first and said second user to search for said media file identifier from a media file source.

31. The method of claim 30 wherein said media file source comprises an on-demand streaming media file service.

32. The method of claim 30 wherein said media file source comprises either one or both of said first and said second user's local media library.

33. The method of claim 30 wherein the media file source comprises a third user's media file library.

34. The method of claim 1 wherein said playlist creation tool comprises a searching software module that allows a user to search by input criteria for at least one media file identifier from a media file source.

35. The method of claim 34 wherein said input criteria comprises an artist name.

36. The method of claim 34 wherein said input criteria comprises an album name.

37. The method of claim 34 wherein said input criteria comprises a media file title.

38. The method of claim 34 wherein said input criteria comprises a list of recommended media files.

39. The method of claim 34 wherein said input criteria comprises a set of highly rated media files.

40. The method of claim 1 wherein said selection of said media file identifier to be included in said collaborative playlist is via a single icon on a user interface which allows each user to add said media file identifier to be included in said collaborative playlist via a single click of said icon.

41. The method of claim 40 wherein upon adding said media file identifier to said playlist, said media file identifier is displayed essentially simultaneously on said playlist.

42. The method of claim 40 wherein said selection of said media file identifier to be included in said collaborative playlist is via dragging and dropping said media file identifier from a first area to a second area of said user interface.

43. The method of claim 1 wherein said playlist creation tool comprises a browser to permit browsing for media file identifiers from multiple media file sources.

44. The method of claim 1 wherein said first user and said second user communicate via server.

45. The method of claim 1 wherein said first user and said second user communicate via a network.

46. The method of claim 1 wherein said first user and said second user communicate via the internet.

47. The method of claim 1 further comprising facilitating the display of said playlist at each user's computing device.

48. The method of claim 47 wherein said playlist can be saved to each user's respective computing device, at each user's respective option.

49. The method of claim 47 wherein, via said provided playlist application, each user can independently edit said playlist from each user's respective computing device.

50. The method of claim 49 wherein upon editing, each user's edits are only displayed on each user's respective computing device.

51. The method of claim 1 wherein the ability of each user to access a media file associated with said media file identifier is governed by a permission level.

52. The method of 51 wherein said permission level is associated with the media file.

53. The method of claim 51 wherein said permission level is controlled by a subscription from a service provider.

54. A server comprising:
a plurality of processors;
a communications software module implemented via at least one of said plurality of processors of said server that establishes communication over a network with a first user at a first computing device and a second user at a second computing device; and
a data distribution software module implemented via at least one of said plurality of processors of said server that receives a first data set associated with a first media file from the first computing device and transmits the first data set to the second computing device, the data distribution software module receiving a second data set associated with a second media file from a second computing device and transmitting the second data set to the first computing device so that the first computing device can include an identifier of the second media file in a playlist that is essentially simultaneously viewed on both the first computing device and the second computing device as the playlist is being created by the first user and second user.

55. The server of claim 54 wherein either one or both of said first data set and said second data set comprises a media file identifier.

56. The server of claim 54 wherein either one or both of said first data set and said second data set comprises a name.

57. The server of claim 54 wherein either one or both of said first data set and said second data set comprises a uniform resource locator.

58. The server of claim 54 wherein either one or both of said first data set and said second data set comprises a pointer.

59. The server of claim 54 wherein said second media file is obtainable by downloading said second media file from said server.

60. The server of claim 54 wherein said second media file is obtainable by streaming said second media file from said server.

61. The server of claim 54 wherein said second media file is obtainable from a local storage medium of either one or both of said first and said second computing device.

62. The server of claim 54 wherein either one or both of said first and second media file is an audio file.

63. The server of claim 54 wherein either one or both of said first and second media file is a video file.

64. The server of claim 54 wherein said server identifies either one or both of said first and said second media file as a result of a search, based on an input criteria, performed by either one or both of said first and said second user.

65. The server of claim 64 wherein said input criteria comprises a rating.

66. The server of claim 64 wherein said input criteria comprises an artist name.

67. The server of claim 64 wherein said input criteria comprises a media file name.

68. The server of claim 54 wherein said communication is established via an instant messaging application.

69. The server of claim 54 wherein said data distribution module sends a playlist creation tool to either one or both of said first and said second computing device upon a request from either said first or said second user.

70. The server of claim 69 wherein said playlist creation tool comprises a user interface displayable on said first computing device and on said second computing device.

71. The server of claim 70 wherein said second computing device receives information about said playlist from said first computing device via a instant messaging software application.

72. The server of claim 69 wherein said first computing device receives information about said playlist from said second computing device via said instant messaging software application.

73. The server of claim 54 wherein said playlist comprises said first data set and said second data set.

74. The server of claim 54 wherein either one or both of said first and said second computing device comprises a cellular phone.

75. The server of claim 54 wherein either one or both of said first and said second computing device comprises a portable media player.

76. The server of claim 54 wherein either one or both of said first and said second computing device comprises a personal digital assistant.

77. A program storage device tangibly embodying a program of instructions executable by a computing device to perform method steps comprising:
   initiating, in response to an input from a first user, an instant messaging communication between said first user at said computing device and a second user at a second computing device;
   visibly displaying on the computing device, for said first user, a playlist application accessible by both said first user and said second user for essentially simultaneous interaction by said first user and said second user with a playlist creation tool, the playlist creation tool enabling said first user and said second user to collaboratively create a playlist usable to play media files, said playlist being visibly displayed to said first and said second user as it is being collaboratively created; and
   receiving, via the playlist creation tool, a media file identifier selected by either one or both of the users for inclusion on said playlist.

78. The program storage device of claim 77, further comprising saving said playlist at each user's respective computing device.

79. The program storage device of claim 78 wherein saving said playlist comprises clicking a single icon located on a user interface displayed by said playlist application.

80. The program storage device of claim 77, further comprising initiating a search of media source for said media file identifier based upon input criteria from either one or both of said first and said second user.

81. The program storage device of claim 77, further comprising acquiring said media file identifier from a server.

82. The program storage device of claim 77, further comprising acquiring said media file identifier from said first user's local media library.

83. The program storage device of claim 77, further comprising acquiring said media file identifier from said second user's local media library.

84. The program storage device of claim 77, further comprising acquiring said media file identifier from a third user's local media library.

85. The program storage device of claim 77, further comprising acquiring said media file via streaming said media file identifier to the user.

86. The program storage device of claim 77, further comprising acquiring said media file via downloading said media file to either one or both of said first and said second computing device from a remote media file source.

87. The program storage device of claim 77 wherein said provided playlist application, each user can ,independently edit said playlist from each user's respective computing device.

88. The program storage device of claim 87 wherein upon editing, each user's edits are only displayed on each user's respective computing device.

89. A method comprising:
   initiating, in response to an input from a first user, an instant messaging communication between said first user at said computing device and a second user at a second computing device;
   displaying a playlist application and playlist creation area accessible by both said first user and said second user for essentially simultaneous interaction by said first user and said second user with a playlist creation tool for collaboratively creating a playlist usable to play media files, said playlist being visibly displayed to said first and said second user as it is being collaboratively created; and
   receiving, via the playlist creation tool, a media file identifier selected by either one or both of the users for inclusion on said playlist.

90. The method of claim 89, further comprising saving said playlist at each user's respective computing device.

91. The method of claim 90, above wherein saving said playlist comprises clicking a single icon located on a user interface displayed by said playlist application.

92. The method of claim 89, further comprising initiating a search of media source for said media file identifier based upon input criteria from either one or both of said first and said second user.

93. The method of claim 89, further comprising acquiring said media file identifier from a server.

94. The method of claim 89, further comprising acquiring said media file identifier from said first user's local media library.

95. The method of claim 89, further comprising acquiring said media file identifier from said second user's local media library.

96. The method of claim 89, further comprising acquiring said media file identifier from a third user's local media library.

97. The method of claim 89, further comprising acquiring said media file via streaming said media file to the user.

98. The method of claim 89, further comprising acquiring said media file via downloading said media file to either one or both of said first and said second computing device from a remote media file source.

99. The method of claim 89 wherein each user can independently edit said playlist from each user's respective computing device.

100. The method of claim 99 wherein upon editing, each user's edits are only displayed on each user's respective computing device.

* * * * *